(12) United States Patent
Wagner et al.

(10) Patent No.: US 11,588,308 B2
(45) Date of Patent: Feb. 21, 2023

(54) CABLE STRIPPING SYSTEMS, DEVICES, AND METHODS FOR PERFORMING THE SAME

(71) Applicant: Universal Electric Corporation, Canonsburg, PA (US)

(72) Inventors: Jeff Wagner, Pittsburgh, PA (US); Brett Keller, McDonald, PA (US)

(73) Assignee: Starline Holdings, LLC, Canonsburg, PA (US)

( * ) Notice: Subject to any disclaimer, the term of this patent is extended or adjusted under 35 U.S.C. 154(b) by 411 days.

(21) Appl. No.: 16/166,254

(22) Filed: Oct. 22, 2018

(65) Prior Publication Data

US 2019/0123527 A1 Apr. 25, 2019

Related U.S. Application Data

(60) Provisional application No. 62/576,411, filed on Oct. 24, 2017.

(51) Int. Cl.
*H02G 1/12* (2006.01)
(52) U.S. Cl.
CPC ......... *H02G 1/1265* (2013.01); *H02G 1/1256* (2013.01)
(58) Field of Classification Search
CPC .. H02G 1/1265; H02G 1/1256; H02G 1/1248; Y10T 29/514
See application file for complete search history.

(56) References Cited

U.S. PATENT DOCUMENTS

| 1,052,271 | A | | 2/1913 | Pessin |
| 2,374,211 | A | | 4/1945 | Kane |
| 3,346,897 | A | | 10/1967 | Nelson |
| 3,368,428 | A | | 2/1968 | Ragnar |
| 3,832,767 | A | * | 9/1974 | Petree ................. H02G 1/1295 81/9.51 |
| 4,188,702 | A | * | 2/1980 | Herbert ............... H02G 1/1256 29/426.6 |

(Continued)

FOREIGN PATENT DOCUMENTS

| CN | 2598220 Y | 1/2004 |
| CN | 103560443 A | 2/2014 |

(Continued)

*Primary Examiner* — Brian D Keller
(74) *Attorney, Agent, or Firm* — Dinsmore & Shohl LLP

(57) ABSTRACT

A stripping system that includes a securement device including a receiver platform and an engagement platform sized to receive at least a portion of a large diameter cable having an outer jacket defining a thickness of at least 0.5 mm. The engagement platform translates relative to the receiver platform to secure the cable to the securement device. The system includes a cutting device including a receiver platform that includes a first cutting apparatus and an engagement platform that includes a second cutting apparatus. The receiver platform is sized to receive at least a portion of the cable. The engagement platform translates relative to the receiver platform to move the second cutting apparatus toward the first cutting apparatus to define a cutting interface that is sized to partially sever the outer jacket such that at least a portion of the 0.5 mm thickness of the outer jacket remains partially intact.

14 Claims, 13 Drawing Sheets

(56) References Cited

U.S. PATENT DOCUMENTS

| | | | | |
|---|---|---|---|---|
| 4,250,772 | A | * 2/1981 | Graber | H02G 1/1248 |
| | | | | 81/9.51 |
| 4,942,789 | A | * 7/1990 | Hoffa | H02G 1/1265 |
| | | | | 81/9.51 |
| 4,993,287 | A | * 2/1991 | Carpenter | G02B 6/4497 |
| | | | | 81/9.51 |
| 5,582,078 | A | * 12/1996 | Talley | H02G 1/1265 |
| | | | | 81/9.42 |
| 5,664,324 | A | * 9/1997 | Hoffa | H02G 1/1256 |
| | | | | 29/33 M |
| 5,896,786 | A | * 4/1999 | Akita | H02G 1/1256 |
| | | | | 81/9.41 |
| 6,766,724 | B2 | 7/2004 | Bernadelle et al. | |
| 6,910,256 | B2 | * 6/2005 | Locher | H01R 43/05 |
| | | | | 29/564.4 |
| 8,839,695 | B2 | 9/2014 | Newman | |
| 9,083,167 | B2 | 7/2015 | Wang | |
| 2014/0345143 | A1 | 11/2014 | Newman | |
| 2018/0031794 | A1 | * 2/2018 | Sakmar | H02G 3/32 |

FOREIGN PATENT DOCUMENTS

| | | | |
|---|---|---|---|
| CN | 203707680 | U | 7/2014 |
| CN | 103972766 | A | 8/2014 |
| CN | 205452771 | U | 8/2016 |
| DE | 3711134 | A1 | 10/1988 |
| EP | 0365437 | A1 | 4/1990 |
| EP | 1257028 | A3 | 11/2003 |
| EP | 1667296 | A2 | 6/2006 |

\* cited by examiner

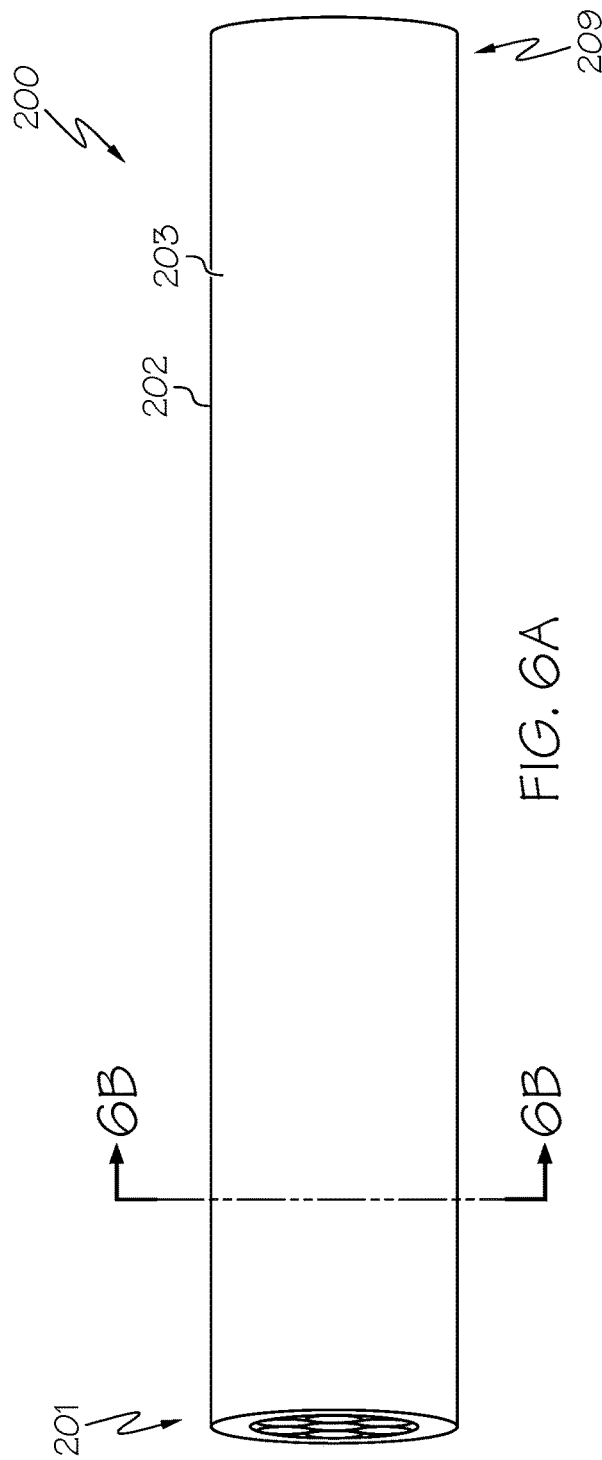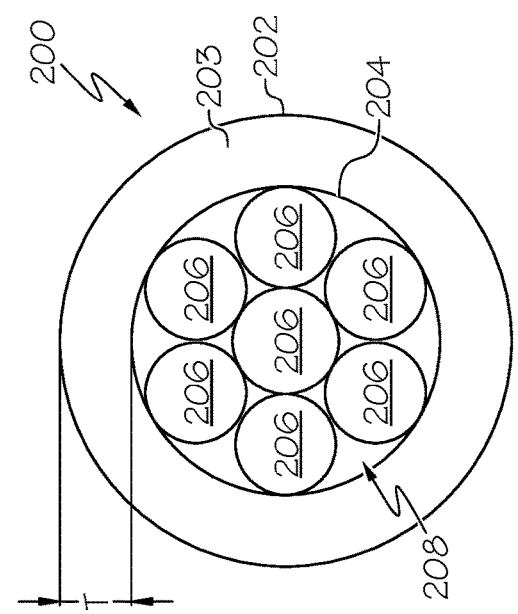

CABLE STRIPPING SYSTEMS, DEVICES, AND METHODS FOR PERFORMING THE SAME

PRIORITY

The present application claims priority to U.S. Provisional Application Ser. No. 62/576,411, filed Oct. 24, 2017, entitled "Devices, Systems, and Methods for Stripping Large Diameter Electrical Cords," the disclosure of which is incorporated by reference herein.

TECHNICAL FIELD

The present specification generally relates to cable stripping systems, and more particularly, to systems capable of removing of an outer protective jacket of a relatively large cable or cord, such as a jacket of a multiconductor electrical cable, and methods for operating the same.

BACKGROUND

Cables and cords generally include a protective outer jacket or coating disposed around one or more internal components of the cable for purposes of shielding the internal components from external exposure. The one or more internal components of a cable or a cord are shielded from external exposure to prevent damage to the internal components and/or protect other external components from direct contact and/or exposure to the internal components.

Electrical cables may include one or more electrical conductors extending within an outer jacket of the electrical cable. To access the internal components of the cable, the protective outer jacket may be partially removed (i.e., stripped) to thereby expose the a portion of the internal components (e.g., conductors). With the protective outer jackets generally being formed from a durable coating material, removing the outer jacket typically requires use of a cutting instrument and manual separation of the weakened portion of the outer jacket from the remaining jacket in a particular manner to avoid damage to the internal components surrounded by the outer jacket. Manually cutting, gripping, and pulling the outer jacket to expose the internal components encapsulated therein may be difficult for a user, may expose a user to potential injury, may be excessively time consuming, may be inefficient, and/or may result in damage to the electrical cable. This may particularly be prevalent when the cable includes a protective outer jacket having a relatively large thickness, such as, for example, large diameter cables.

SUMMARY

In one embodiment, a stripping system including a securement device including a receiver platform and an engagement platform, with the receiver platform sized and shaped to receive at least a portion of a large diameter cable having an outer jacket defining a diameter of at least 0.5 mm. The engagement platform translates relative to the receiver platform to compress against at least the portion of the large diameter cable received along the receiver platform to thereby secure the large diameter cable to the securement device. The stripping system further includes a cutting device including a receiver platform and an engagement platform, with the receiver platform of the cutting device including a first cutting apparatus and the engagement platform of the cutting device including a second cutting apparatus. The receiver platform of the cutting device is sized and shaped to receive at least a portion of the large diameter cable therein, and the engagement platform of the cutting device translates relative to the receiver platform to move the second cutting apparatus toward the first cutting apparatus to thereby position at least the portion of the large diameter cable received within the receiver platform between the first and second cutting apparatuses. The first and second cutting apparatuses define a cutting interface positioned therebetween that is sized to partially sever the outer jacket of the large diameter cable such that at least a portion of the 0.5 mm thickness of the outer jacket remains partially intact. The securement device moves relative to the cutting device to sever and separate at least the portion of the large diameter cable received within the cutting device from at least the portion of the large diameter cable received within the securement device.

In another embodiment, a stripping system includes a securement device including: a receiver platform defining a support surface that is sized to hold a large diameter cable including an outer jacket having a thickness of at least 0.5 mm, and an engagement platform defining a compression surface positioned in alignment with the support surface of the receiver platform. The compression surface compresses the large diameter cable held along the receiver platform against the support surface when the engagement platform moves toward the receiver platform. The stripping system includes a cutting device including: a receiver platform including a first cutting apparatus having a first blade curvature, and an engagement platform including a second cutting apparatus having a second blade curvature. The second cutting apparatus is positioned in alignment with the first cutting apparatus of the receiver platform, and the engagement platform and the receiver platform of the cutting device define a cutting interface between the first and second cutting apparatuses when the engagement platform of the cutting device moves toward the receiver platform of the cutting device. The first and second blade curvatures are sized to only partially sever the thickness of the outer jacket at the cutting interface when the engagement platform of the cutting device moves toward the receiver platform of the cutting device.

In another embodiment, a method of stripping an outer jacket of a large diameter cable using a stripping system including a securement device and a cutting device, the method includes positioning a proximal portion of the large diameter cable against a receiver platform of the securement device and a distal portion of the large diameter cable against a receiver platform of the cutting device, moving an engagement platform of the securement device toward the receiver platform of the securement device to engage the large diameter cable and securely fasten the large diameter cable to the securement device, and moving an engagement platform of the cutting device toward the receiver platform of the cutting device to at least partially sever the outer jacket of the distal portion of the large diameter cable positioned against the receiver platform of the cutting device. The method further includes moving the cutting device relative to the securement device to separate the severed outer jacket from the distal portion of the large diameter cable.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6A schematically depicts a side view of the protective outer jacket of an illustrative electrical cable having a protective outer jacket and one or more internal components disposed within the protective outer jacket according to one or more embodiments shown and described herein;

FIG. 6B schematically depicts a front view of the electrical cable of FIG. 6A according to one or more embodiments shown and described herein;

DETAILED DESCRIPTION

The embodiments described herein are generally directed to systems and devices that are configured to remove at least a portion of a protective outer jacket (i.e., sheath) of a cable or cord. In particular, the systems and devices described herein are sized and shaped to accommodate particularly large cables, such as, for example, large diameter multiconductor electrical cables having protective outer jackets with relatively great thicknesses. Accordingly, the stripping systems of the present disclosure are configured to securely grasp, sever, and separate a large diameter protective outer jacket from a cable defining a large diameter and/or including a plurality of internal components therein without severing or damaging the internal components located therein.

As used herein, the term "large diameter" generally refers to cables having a diameter (i.e., thickness) ranging from about 3.25 millimeters (about 0.128 inches) to about 11.70 millimeters (about 0.4606 inches). In some embodiments, the term "large diameter" generally refers to the cable including a diameter consistent with that described above and a protective outer jacket disposed thereon, with the protective outer jacket having a diameter (i.e., thickness) ranging from about 0.50 millimeters (about 0.019 inches) to about 10.0 millimeters (0.393 inches). As merely an illustrative example, cables comprising a large diameter can be cables sized at least 8 AWG ("American Wire Gauge") or larger (e.g., 7 AWG, 6 AWG, 5 AWG, 4 AWG, 3 AWG, 2 AWG, 1 AWG, 0 AWG, 00 AWG, 000 AWG, 0000 AWG, and the like).

Figure 1:
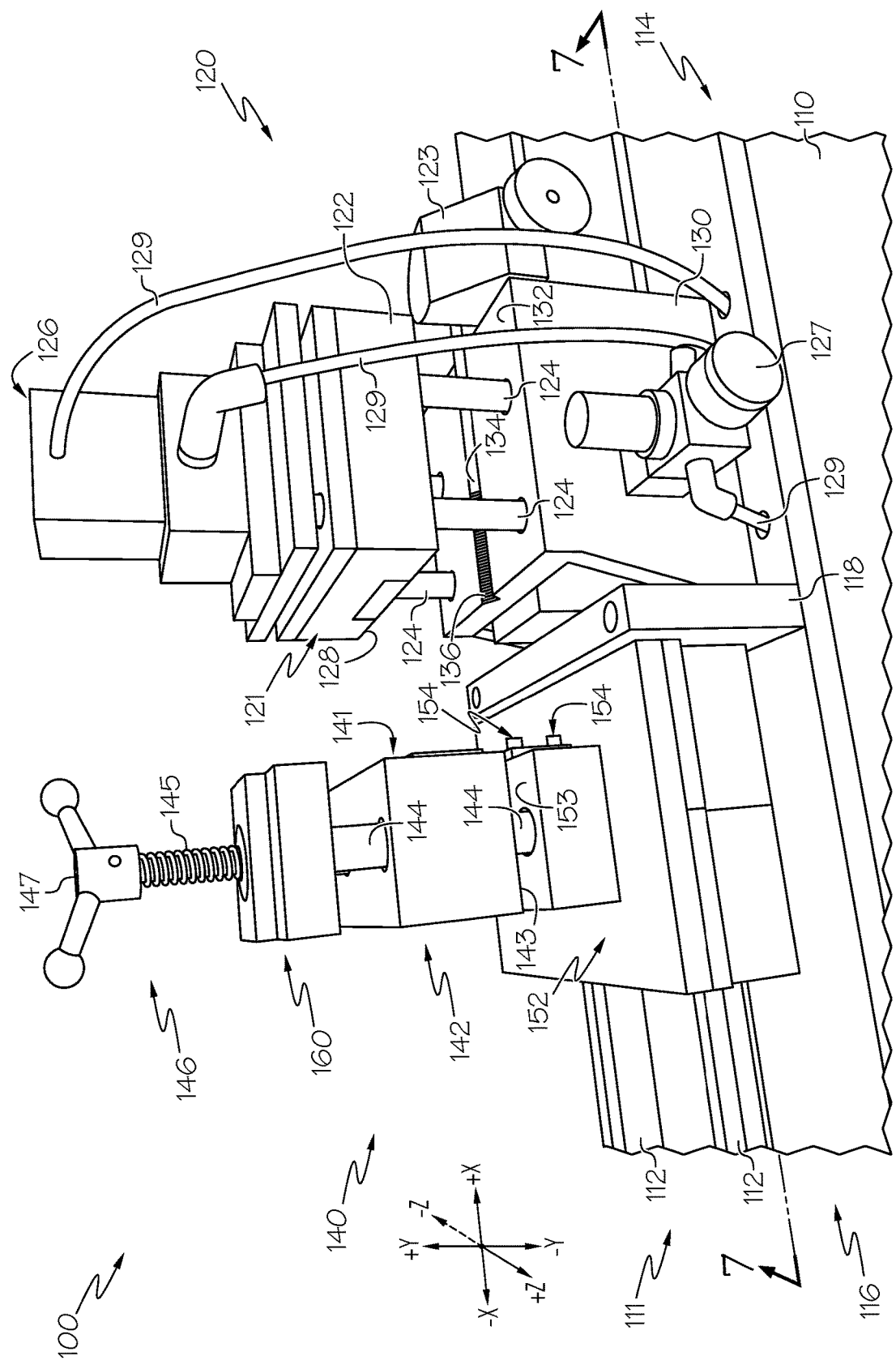
FIG. 1 schematically depicts a side view of an illustrative stripping system according to one or more embodiments shown and described herein.
Figure 2:
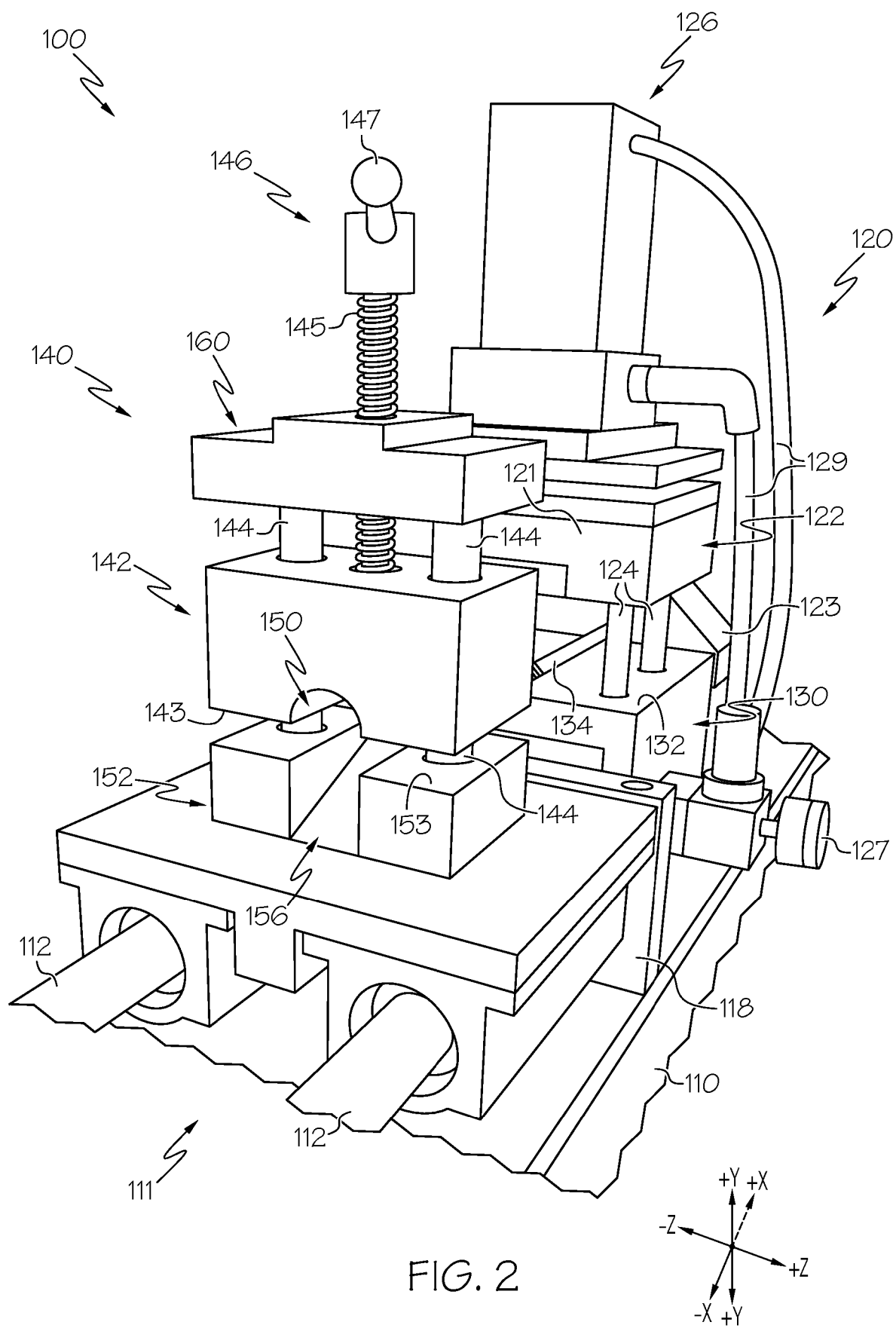
FIG. 2 schematically depicts a perspective view of the stripping system of FIG. 1 according to one or more embodiments shown and described herein.

Referring initially to FIGS. 1-2, a non-limiting example of a stripping system 100 is illustrated. The stripping system 100 includes a base 110, a securement device 120, and a cutting device 140. The securement device 120 and the cutting device 140 are coupled to the base 110. In some embodiments, the securement device 120 is securely fixed to the base 110 at a first end 114 of the base 110 and the cutting device 140 is movably coupled to the base 110 at a second end 116 of the base 110. In particular, the base 110 includes a transport mechanism 111 for moving the cutting device 140 along the base 110 relative to the ends 114, 116, and in particular to the securement device 120. In other embodiments, the securement device 120 is movably coupled to the transport mechanism 111 of the base 110 and the cutting device 140 is securely fixed. Additionally, both the securement device 120 and the cutting device 140 are movably coupled to the transport mechanism 111 of the base 110 such that the securement device 120 and the cutting device 140 are movable relative to one another in some embodiments.

In the present example, the transport mechanism 111 comprises one or more rails 112 extending along a longitudinal length of the base 110 between the first end 114 and the opposite, second end 116 of the base 110. Accordingly, the one or more rails 112 define a horizontal travel path of the cutting device 140. The cutting device 140 is slidably coupled to the rails 112 such that the cutting device 140 is translatable along the rails 112 toward and away from the securement device 120 (e.g., in the +X/−X direction of the coordinate axes of FIG. 1). Additionally or alternatively, in some embodiments the cutting device 140 (and/or the securement device 120) may be rotatably coupled to the one or more rails 112 such that the cutting device 140 rotates about the rails 112 (e.g., rotating about the x-axis of the coordinate axes of FIG. 1).

Still referring to FIGS. 1-2, the base 110 further includes a stop wall 118 extending outwardly from the base 110, in the +Y direction of the coordinate axes of FIG. 1, between the first end 114 and the second end 116. The one or more rails 112 of the base 110 terminate at the stop wall 118 such that the stop wall 118 defines a terminal end of the horizontal travel path of the cutting device 140 along the X-axis of the coordinate axes of FIG. 1. It should be understood that in other embodiments, the base 110 may include various other transport mechanisms for slidably moving the devices of the stripping system 100, including but not limited to, tracks, wheels, rollers, and the like. In some embodiments, the securement device 120 may be slidably coupled to the rails 112 in addition or alternatively to the cutting device 140 such that the securement device is translatable along the base 110. It should further be understood that in some embodiments the stop wall 118 may be omitted entirely.

The securement device 120 includes an engagement platform 122 and a receiver platform 130. In particular, the receiver platform 130 is fixedly secured to the base 110 and the engagement platform 122 is movably coupled to the receiver platform 130 such that the engagement platform 122 is movable relative to the receiver platform 130 in the Y-axis of the coordinate axes of FIG. 1. The securement device 120 includes one or more columns 124 extending through and between the engagement platform 122 and the receiver platform 130. The one or more columns 124 define a vertical travel path of the engagement platform 122 in the +Y/−Y direction of the coordinate axes of FIG. 1. The engagement platform 122 is slidably coupled to the columns 124 such that the engagement platform 122 is translatable along the columns 124 toward and away from the receiver platform 130 of the securement device 120 (e.g., in the +Y/−Y direction of the coordinate axes of FIG. 1). It should be understood that in other embodiments, the engagement platform 122 may be securely fixed relative to the receiver platform 130 and the receiver platform 130 may be movably coupled to the engagement platform 122 such that the receiver platform 130 is movable relative to the engagement platform 122 in the Y-axis of the coordinate axes of FIG. 1. Alternatively, the engagement platform 122 and the receiver platform 130 may be movably coupled to the one or more columns 124 such that the engagement platform 122 and the receiver platform 130 are vertically movable relative to one another (e.g., in the +Y/−Y direction of the coordinate axes of FIG. 1).

It should be understood that despite the engagement platform 122 and the receiver platform 130 of the securement device 120 being depicted and described herein in a vertical arrangement, in other embodiments the securement device 120 may be arranged in a horizontal configuration (e.g., along the X-axis of the coordinate axes of FIG. 1). The stripping system 100 further includes a driving mechanism 126 and a divider 127. In the present example, the driving mechanism 126 is attached to the engagement platform 122 and the divider 127 is secured to the base 110, however, it should be understood that the driving mechanism 126 and/or the divider 127 may be secured to the stripping system 100 along various other positions than that shown and described herein. The driving mechanism 126 is fluidly coupled to the divider 127 via a conduit 129 coupled thereto, such that the driver mechanism 126 transfers compressed gas and/or pressure to the divider 129 via the conduit 129. The divider 127 is further coupled to the engagement platform 122 of the securement device 120 via another conduit 129 and is further coupled to the cutting device 140 via an additional conduit 129.

The driving mechanism 126 is operable to translate the engagement platform 122 along the one or more columns 124 toward and away from the receiver platform 130 (e.g., along the Y-axis of the coordinate axes of FIG. 1). In the present example, the driving mechanism 126 is a pneumatic clamping device such that the driving mechanism 126 pneumatically generates a force and/or pressure to translate the engagement platform 122 relative to the receiver platform 130 upon actuation of the driving mechanism 126.

Still referring to FIGS. 1-2, the driving mechanism 126 is further operable to translate the cutting device 140 along the one or more rails 112 of the base 110 toward and away the securement device 120 (e.g., along the X-axis of the coordinate axes of FIG. 1). As generally described above, the driving mechanism 126 is in communication with the engagement platform 122 of the securement device 120 and the cutting device 140 through a series of conduits 129. In particular, the driving mechanism 126 is fluidly coupled with the divider 127 via the conduit 129, and the engagement platform 122 and the cutting device 140 are fluidly coupled to the divider 127 via one or more additional conduits 129. The divider 127 distributes a force and/or pressure generated by the driving mechanism 126 to the securement device 120 and the cutting device 140, respectively, such that actuation of the driving mechanism 126 is operable to initiate movement of both the securement device 120 and the cutting device 140. By way of example only, the divider 127 is a force and/or pressure compensated flow valve that can receive a source flow (i.e., from the driving mechanism 126) and divide it between two parallel devices (i.e., the securement device 120 and the cutting device 140). Accordingly, both the engagement platform 122 and the cutting device 140 are actuated and movable in response to activation of the driving mechanism 126. By way of further example, the divider 127 is a pneumatic pump divider that is operable to divert a force of compressed gas from the driving mechanism 126 to multiple components coupled thereto (i.e., the securement device 120 and the cutting device 140).

In some embodiments, upon actuation of the driving mechanism 126, the engagement platform 122 of the securement device 120 and the cutting device 140 move simultaneously. For example, the engagement platform 122 of the securement device 120 may translate toward the receiver platform 130 of the securement device 120 (i.e., along the Y-axis of the coordinate axes of FIG. 1) and the cutting device 140 may translate along the rails 112 (i.e. along the X-axis of the coordinate axes of FIG. 1) in response to a single actuation of the driving mechanism 126. In this instance, the driving mechanism 126 transfers a sufficient amount of pressure to the divider 127 to provide for the respective movements of both the securement device 120 and the cutting device 140 as described above. In other embodiments, the driving mechanism 126 requires separate actuation to move the engagement platform 122 of the securement device 120 and the cutting device 140, respectively. For example, a user of the stripping system 100 may be required to actuate the driving mechanism 126 to translate the engagement platform 122 of the securement device 120 toward the receiver platform 130 of the securement device (i.e., along the Y-axis of the coordinate axes of FIG. 1) and may be required to actuate the driving mechanism 126 again to subsequently translate the cutting device 140. It should be understood that the driving mechanism 126 may be activated by an actuation member, such as, for example, a hand lever, a foot pedal, a button, and the like.

It should be understood that in other embodiments the driving mechanism 126 may be a manual clamping device such that physical force is required to actuate the driving mechanism 126 to thereby translate the engagement platform 122 of the securement device 120. The securement device 120 of the present disclosure may include various other versions of the driving mechanism 126, such as a screw-driven actuator, a wheel and axle driven actuator, a cam actuator, a hydraulic actuator, and the like.

Referring to FIG. 1, the engagement platform 122 of the securement device 120 further includes a compression surface 128 positioned in alignment with and facing the receiver platform 130 of the securement device 120. Accordingly, the compression surface 128 is configured to translate toward and engage the receiver platform 130 (e.g., in the −Y direction of the coordinate axes of FIG. 1) in response the actuation of the driving mechanism 126. For example, the compression surface 128 engages the receiver platform 130 upon translation of the engagement platform 122 toward the receiver platform 130 in the −Y direction of the coordinate axes of FIG. 1 until the engagement platform 122 contacts the receiver platform 130.

The receiver platform 130 of the securement device 120 includes a support surface 132 that is positioned in alignment with and facing toward the engagement platform 122 of the securement device 120. In particular, the support surface 132 is configured to engage the compression surface 128 of the engagement platform 122 in response to the actuation of the driving mechanism 126 and translation of the engagement platform 122 toward the receiver platform 130.

In some embodiments, the support surface 132 of the receiver platform 130 may include a cable channel 134 extending therethrough. In particular, the cable channel 134 is a recessed cavity formed along the support surface 132. The cable channel 134 is sized and shaped to receive and securely hold a large diameter cable 200 along the support surface 132. In the present example, the cable channel 134 is shaped to form a semi-circular profile (i.e., a "U-shaped" channel) that corresponds to an exterior profile of an object to be received therein (e.g., a large diameter cable 200). In other embodiments, the cable channel 134 may be shaped to form various other profiles suitable for receiving an object to be stripped by the stripping system 100, such as, for example, a "V-shaped" channel.

Figure 3:
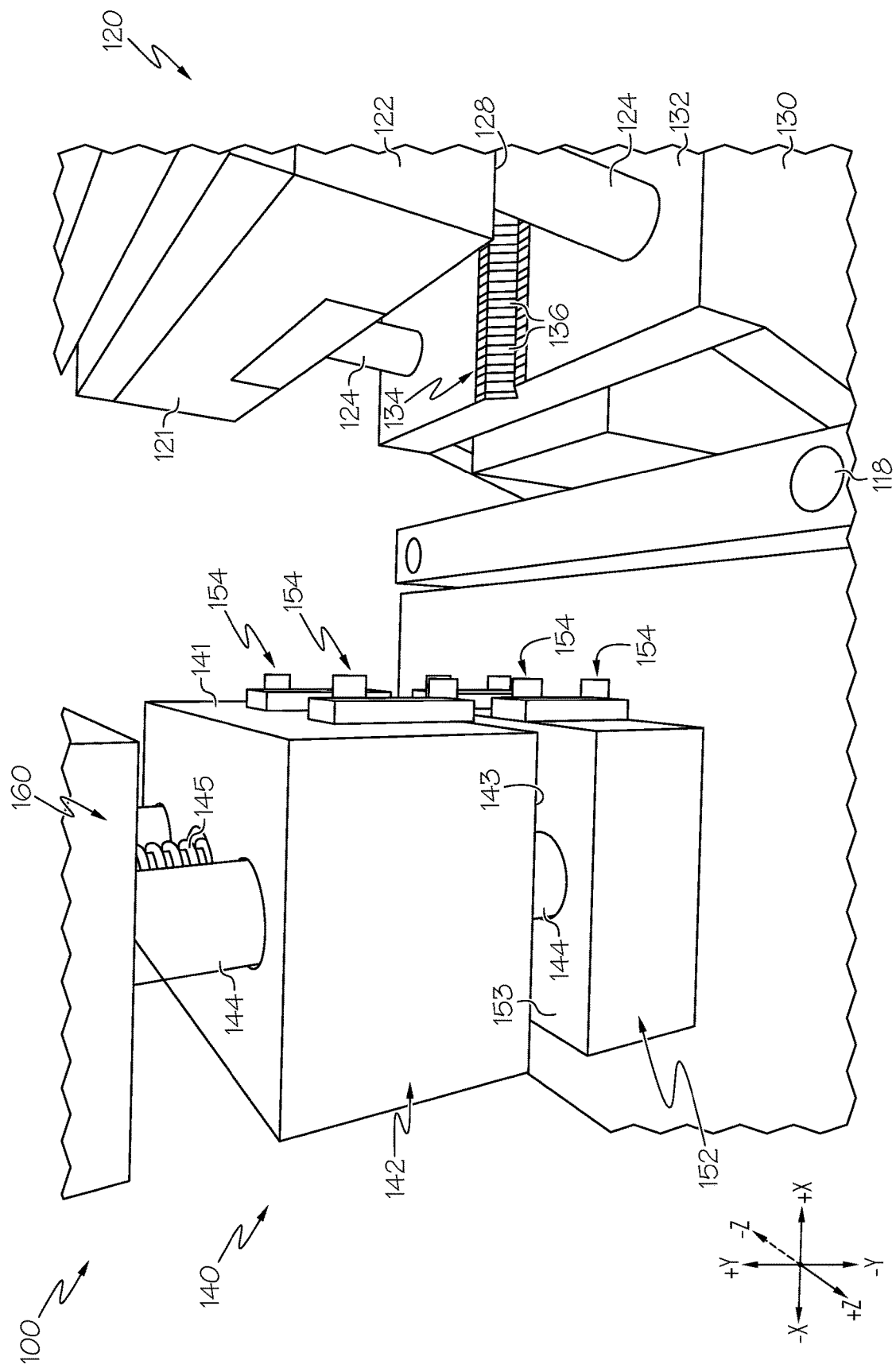
FIG. 3 schematically depicts a side view of the stripping system of FIG. 1 at an interface region between an illustrative securement device and an illustrative cutting device according to one or more embodiments shown and described herein.

The cable channel 134 includes a plurality of gripping features 136 extending therein along at least a portion of a longitudinal length of the cable channel 134. In the present example, the plurality of gripping features 136 is in the form of ribs extending outwardly from the cable channel 134 (FIG. 3). The plurality of gripping features 136 generate a frictional resistance within the cable channel 134, such that the plurality of gripping features 136 are operable to securely grasp and retain the large diameter cable 200 received within the cable channel 134 when the engagement platform 122 is compressed against the receiver platform 130. Accordingly, the plurality of gripping features 136 inhibits an inadvertent removal of the large diameter cable 200 from the cable channel 134 of the receiver platform 130 when the engagement platform 122 is compressed against the receiver platform 130. In other embodiments, the plurality of gripping features 136 may be in the form of protrusions, teeth, adhesives, and the like.

The securement device 120 further includes one or more alignment features 123 positioned adjacent to the receiver platform 130 and adjacent to the first end 114 of the base 110. The one or more alignment features 123 are positioned in alignment with the cable channel 134 of the support surface 132 and serve to align the large diameter cable 200 with the cable channel 134. In particular, the securement device 120 may include a pair of alignment features 123 that are separated from one another by a predetermined lateral distance (i.e., along the Z-axis of the coordinate axes of FIG. 1) that corresponds to a size of the cable channel 134. Accordingly, an object received between the pair of alignment features 123 (e.g., the large diameter cable 200) is thereby positioned in alignment with the cable channel 134 to facilitate the cable channel 134 receiving the object therein. This alignment is attributable to the relative position of the pair of alignment features 123 relative to one another and the position of the alignment features 123 relative to the cable channel 134. In some embodiments the one or more alignment features 123 may be selectively maneuverable such that the alignment features 123 are movable relative to the support surface 132 of the receiver platform 130 to accommodate varying sizes and/or positions of the cable channel 134 along the support surface 132 of the receiver platform 130. In other embodiments, the one or more alignment features 123 may be selectively adjustable such that a distance between a pair of alignment features 123 are adjusted in accordance with a size of the large diameter cable 200 inserted in the cable channel 134.

Still referring to FIGS. 1-2, the cutting device 140 of the stripping system 100 includes an engagement platform 142 and a receiver platform 152. In particular, the receiver platform 152 is fixedly secured relative to the engagement platform 142 and the engagement platform 142 is movably coupled to the receiver platform 152 (e.g., in the +Y/−Y direction of the coordinate axes of FIG. 1). Accordingly, the engagement platform 142 is movable relative to the receiver platform 152 of the cutting device 140 along the Y-axis of the coordinate axes of FIG. 1. The cutting device 140 includes one or more columns 144 extending through and between the engagement platform 142 and the receiver platform 152 in the Y-axis direction of the coordinate axes of FIG. 1. The one or more columns 144 define a vertical travel path of the engagement platform 142 (i.e., in the +Y/−Y direction of the coordinate axes of FIG. 1). The engagement platform 142 is slidably coupled to the columns 144 such that the engagement platform 142 is translatable along the columns 144 toward and away from the receiver platform 152 of the cutting device 140 in the Y-axis direction of the coordinate axes of FIG. 1. It should be understood that in other embodiments the engagement platform 122 may be securely fixed and the receiver platform 152 may be movably coupled to the engagement platform 142 such that the receiver platform 152 is movable relative to the engagement platform 142 (i.e., in the +Y/−Y direction of the coordinate axes of FIG. 1). Alternatively, in other embodiments the engagement platform 142 and the receiver platform 152 may be movably coupled to the one or more columns 144 such that both the engagement platform 142 and the receiver platform 152 are vertically movable relative to one another along the Y-axis of the coordinate axes of FIG. 1.

It should be understood that despite the engagement platform 142 and the receiver platform 152 of the cutting device 140 being depicted and described herein in a vertical arrangement, in other embodiments the cutting device 140 may be arranged in a horizontal configuration (e.g., along the X-axis of the coordinate axes of FIG. 1). The cutting device 140 further includes a clamp 146 that is operable to translate the engagement platform 142 along the one or more columns 144 toward and away from the receiver platform 152 in the +Y/−Y direction of the coordinate axes of FIG. 1. In the present example, the clamp 146 is a linear actuator such that physical force is required to actuate the clamp 146 to thereby translate the engagement platform 142 of the cutting device 140 along the Y-axis of the coordinate axes of FIG. 1.

Still referring to FIGS. 1-2, the clamp 146 includes an elongated screw 145 and a handle 147 disposed at a terminal end of the elongated screw 145. The elongated screw 145 extends through a stationary platform 160 and the engagement platform 142. It should be understood that the engagement platform 142 receives the elongated screw 145 through a channel extending therethrough and having a threaded portion that meshes with and corresponds to a pitch of the elongated screw 145. The stationary platform 160 receives the elongated screw through a channel extending therethrough that does not have a threaded portion therein. Accordingly, actuation of the clamp 146, and in particular rotation of the handle 147 (i.e., in a direction around the Y-axis of the coordinate axes of FIG. 1), provides for the translation of the engagement platform 142 relative to the receiver platform 152 (i.e., along the Y-axis of the coordinate axes of FIG. 1) with the stationary platform 160 maintained at a relatively fixed position. It should be understood that the stationary platform 160 is not movable in response to rotation of the clamp 146 (i.e., in either direction of the coordinate axes of FIG. 1). Rather, the stationary platform 160 serves to define an upper extent to which the engagement platform 142 may translate to along the +Y direction of the coordinate axes of FIG. 1 in response to actuation of the clamp 146.

It should be understood that in other embodiments, the clamp 146 may be a pneumatic clamping device such that the clamp 146 pneumatically generates a force and/or pressure to translate the engagement platform 142 along the Y-axis of the coordinate axes of FIG. 1 relative to the receiver platform 152 upon actuation of the clamp 146. The cutting device 140 of the present disclosure may include various other versions of the clamp 146, such as an electric linear actuator, a wheel and axle driven actuator, a cam actuator, a hydraulic actuator, and the like.

Referring to FIG. 2, the receiver platform 152 of the cutting device 140 includes a support surface 153 that is positioned in alignment with and facing the engagement platform 142 of the cutting device 140. In particular, the support surface 153 is configured to engage an engagement surface 143 of the engagement platform 142 in response to the actuation of the clamp 146 and translation of the engagement platform 142 toward the receiver platform 152 (e.g., in the −Y direction of the coordinate axes of FIG. 1). For example, the engagement surface 143 contacts the receiver platform 152 upon translation of the engagement platform 142 toward the receiver platform 152 in the =Y direction of the coordinate axes of FIG. 1 until the engagement platform 142 engages the receiver platform 152.

The support surface 153 of the receiver platform 152 includes a cable channel 156 extending therethrough. In particular, the cable channel 156 has a sloped profile and is sized and shaped to receive the large diameter cable 200 along the support surface 153. As described in greater detail herein, the sloped profile of the cable channel 156 forms a ramp that directs a stripped portion of a protective outer jacket 203 of the large diameter cable 200 away from the cutting apparatuses 148, 158 of the cutting device 140 (i.e., in the −X direction of the coordinate axes of FIG. 1) and toward a rear end of the cutting device 140. Accordingly, the sloped profile of the cable channel 134 facilitates retrieval of the stripped portion of the protective outer jacket 203 by a user of the stripping system 100 at a location that is distal from the cutting apparatuses 148, 158 to thereby minimize contact between a user's hand and the cutting apparatuses 148, 158.

In some embodiments, at least a portion of the cable channel 156 may include one or more gripping features to securely hold the long diameter cable 200 therein. Similarly, the engagement surface 143 of the engagement platform 142 includes a cable channel 150 extending therethrough that is in alignment with and facing the cable channel 156 of the receiver platform 152. Accordingly, the cable channel 150 of the engagement platform 142 is translatable relative to the cable channel 156 of the receiver platform 152 (i.e., in the Y-axis direction of the coordinate axes of FIG. 1) in response to actuation of the clamp 146. The cable channel 150 of the engagement platform 142 provides a vertical clearance along the engagement surface 143 for the large diameter cable 200 when the large diameter cable 200 is received within the cutting device 140. In particular, the cable channel 150 is sized and shaped to correspond to a diameter and shape of the large diameter cable 200 to accommodate a distal portion 201 of the large diameter cable 200 therein when the engagement platform 142 is engaged against the receiver platform 152 with the distal portion 201 of the large diameter cable 200 received therebetween. Accordingly, the cable channel 150 serves to ensure sufficient space is provided for a size and length of the distal portion 201 of the large diameter cable 200 received at the cutting device 140.

Referring to FIG. 3, the securement device 120 includes an engagement face 121 positioned toward and facing the cutting device 140 (i.e., in the Y-axis direction of the coordinate axes of FIG. 1). Similarly, the cutting device 140 includes an engagement face 141 positioned toward and facing the securement device 120, and in particular, the engagement face 121 of the securement device 120. The engagement face 141 of the cutting device 140 includes a plurality of fastening members 154 positioned thereon, and in particular the plurality of fastening members 154 are positioned along the engagement face 141 of the engagement platform 142 and the receiver platform 152 of the cutting device 140. As will be described in greater detail herein, the plurality of fastening members 154 facilitate selective attachment and detachment of one or more cutting apparatuses of the engagement platform 142 and the receiver platform 152 of the cutting device 140.

Figure 4:
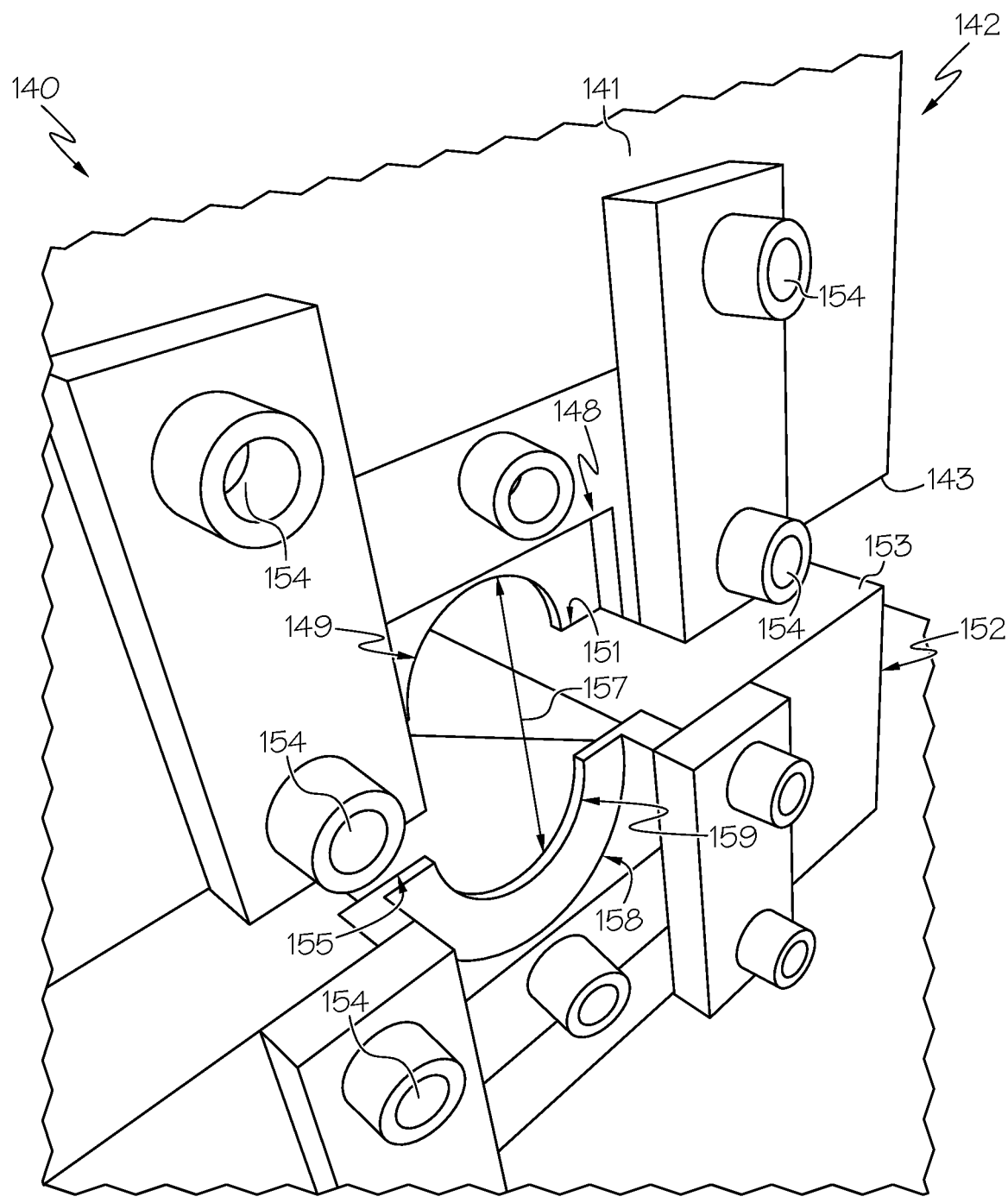
FIG. 4 schematically depicts a perspective view of an illustrative cutting device of the stripping system of FIG. 1 including a pair of cutting apparatuses according to one or more embodiments shown and described herein.

Referring now to FIG. 4, the engagement platform 142 of the cutting device 140 includes a first cutting apparatus 148 along the engagement face 141 of the cutting device 140, and in particular, positioned at and/or proximate to the engagement surface 143 of the engagement platform 142. Accordingly, with the engagement platform 142 positioned relatively above the receiver platform 152, and the engagement surface 143 facing the support surface 153, the first cutting apparatus 148 is oriented toward the receiver platform 152 of the cutting device 140 (i.e., in the Y-axis direction of the coordinate axes of FIG. 1). The receiver platform 152 of the cutting device 140 includes a second cutting apparatus 158 along the engagement face 141 of the cutting device 140, and in particular, positioned at and/or proximate to the support surface 153 of the receiver platform 152. Accordingly, with the receiver platform 152 positioned relatively beneath the engagement platform 142 in the Y-axis direction of the coordinate axes of FIG. 1, and the support surface 153 facing the engagement surface 143 (i.e., along the Y-axis of the coordinate axes of FIG. 1), the second cutting apparatus 158 is oriented toward the engagement platform 142 of the cutting device 140.

The first cutting apparatus 148 of the engagement platform 142 is positioned in alignment with the second cutting apparatus 158 of the receiver platform 152 (i.e., in the Y-axis direction of the coordinate axes of FIG. 1) thereby defining a cutting interface 157 extending therebetween along the Y-axis of the coordinate axes of FIG. 1. Accordingly, the first cutting apparatus 148 is configured to translate toward the second cutting apparatus 158 of the receiver platform 152 (i.e., in the −Y direction of the coordinate axes of FIG. 1) in response to an actuation of the clamp 146 and translation of the engagement platform 142 toward the receiver platform 152 (i.e., in the −Y direction of the coordinate axes of FIG. 1).

The first cutting apparatus 148 of the engagement platform 142 includes a first blade edge 151 and a first blade curvature 149 disposed along the first blade edge 151. The first blade edge 151 is a sharp cutting edge sufficient to cut through at least a portion of a material encountered at the first cutting apparatus 148. The first blade curvature 149 has a radius of curvature that extends the first blade edge 151 relatively away (i.e., upwardly) from the engagement surface 143 of the engagement platform 142 (i.e., in the +Y direction of the coordinate axes of FIG. 1). Accordingly, the first blade curvature 149 vertically offsets the first blade edge 151 of the first cutting apparatus 148 from the engagement surface 143 of the engagement platform 142 (i.e., in the +Y direction of the coordinate axes of FIG. 1). It should therefore be understood that the first cutting apparatus 148 does not encounter the support surface 153 of the receiver platform 152 when the engagement surface 143 of the engagement platform 142 engages the support surface 153 of the receiver platform 152. An edge of the first blade edge 151 and a radius of curvature of the first blade curvature 149 partially defines the cutting interface 157 of the cutting device 140 extending along the Y-axis of the coordinate axes of FIG. 1.

Still referring to FIG. 4, the second cutting apparatus 158 includes a second blade edge 155 and a second blade curvature 159 disposed along the second blade edge 155. The second blade edge 155 is a sharp cutting edge sufficient to cut through at least a portion of a material encountered at the second cutting apparatus 158. The second blade curvature 159 has a radius of curvature that extends the second blade edge 155 relatively away (i.e., downwardly) from the support surface 153 of the receiver platform 152 (i.e., in the −Y direction of the coordinate axes of FIG. 1). Accordingly, the second blade curvature 159 vertically offsets the second blade edge 155 of the second cutting apparatus 158 from the support surface 153 of the receiver platform 152 (i.e., in the −Y direction of the coordinate axes of FIG. 1). It should therefore be understood that the second cutting apparatus 158 does not encounter the engagement surface 143 of the engagement platform 142 when the support surface 153 of the receiver platform 152 engages the engagement surface 143 of the engagement platform 142. Further, the second cutting apparatus 158 does not encounter the first cutting apparatus 148 when the engagement platform 142 engages the receiver platform 152 due to the corresponding curvatures (i.e., offsets) of the cutting apparatuses 148, 158. An edge of the second blade edge 155 and a radius of curvature of the second blade curvature 159 partially defines the cutting interface 157 of the cutting device 140 extending along the Y-axis of the coordinate axes of FIG. 1.

It should be understood that the cutting apparatuses 148, 158 may be various cutting features formed of varying materials, such as, for example, a metal die, steel shears, blades, and the like. In the present example, a radius of curvature, shape, and/or size of the first blade curvature 149 of the first cutting apparatus 148 is substantially similar to a radius of curvature, shape, and/or size of the second blade curvature 159 of the second cutting apparatus 158 such that the large diameter cable 200 received within the cutting interface 157 will be severed to a substantially identical extent (i.e., depth) at a face positioned adjacent to the first cutting apparatus 148 and an opposite face positioned adjacent to the second cutting apparatus 158. It should be understood, however, that the first and second cutting apparatuses 148, 158 may include blade curvatures that having varying curvatures, sizes, and/or shapes such that an object received within the cutting interface 157 (i.e., the large diameter cable 200) is cut at varying depths along opposite ends of the object.

Still referring to FIG. 4, the first and second cutting apparatuses 148, 158, and in particular the first and second blade curvatures 149, 159 define the cutting interface 157 such that an object positioned between the first and second cutting apparatuses 148, 158, such as, for example, the large diameter cable 200, is cut when received at the cutting interface 157. The radii of curvature of the first and second blade curvatures 149, 159 are sized and shaped to define a cutting interface 157 that is configured to only partially sever and/or cut the object received therebetween. Accordingly, a configuration and/or profile of the first and second blade curvatures 149, 159 correspond to a thickness and/or diameter of the large diameter cable 200 received therein, and in particular the outer jacket 203 disposed about the cable 200, such that the first and second cutting apparatuses 148, 158 extend into at least a portion of the outer jacket 203 of the large diameter cable 200 without entirely severing the outer jacket 203 and/or cutting into an inner surface 204 of the large diameter cable 200. Thus, it should be understood that the first cutting apparatus 148 and the second cutting apparatus 158 are particularly sized and shaped accordingly to inhibit contacting, severing, and/or damaging the internal components disposed within the outer jacket 203 of the large diameter cable 200. Even in instances where the first blade edge 151 of the first cutting apparatus 148 contacts the second blade edge 155 of the second cutting apparatus 158, the offset between the blade edge and the corresponding blade curvature (i.e., the depth of curvature of the cutting apparatus) is such that the internal components of the large diameter cable 200 are maintained intact and only a portion of the outer jacket 203 (i.e., a thickness) is severed.

For example, the first and second cutting apparatuses 148, 158 may include blade curvatures 149, 159 that are sized and shaped to cut through about 10% of a thickness of the outer jacket 230 of the large diameter cable 200. In other embodiments the blade curvatures 149, 159 may be sized and shaped to cut through a thickness (i.e., diameter) of the outer jacket 203 ranging from about 20% to about 90%. The blade curvatures 149, 159 are sized and shaped to only partially cut through the outer jacket 203 to ensure the entire thickness of the outer jacket 203 is not severed to thereby prevent contacting and/or damage to any internal components disposed within a core of the large diameter cable 200.

As briefly described above, the first and second cutting apparatuses 148, 158 are securely attached to the engagement platform 142 and the receiver platform 152, respectively, along the engagement face 141 with the plurality of fastening members 154. It should be understood that the first and second cutting apparatuses 148, 158 are selectively coupled to the cutting device 140 such that the first and second cutting apparatuses 148, 158 may be removed and/or replaced by disengaging the plurality of fastening members 154 from the cutting device 140. It should therefore be understood that the cutting apparatuses 148, 158 described and shown herein are merely illustrative examples such that other cutting apparatuses of varying sizes, shapes, and curvatures may be coupled to the cutting device 140 of the stripping system 100.

Figure 5A:
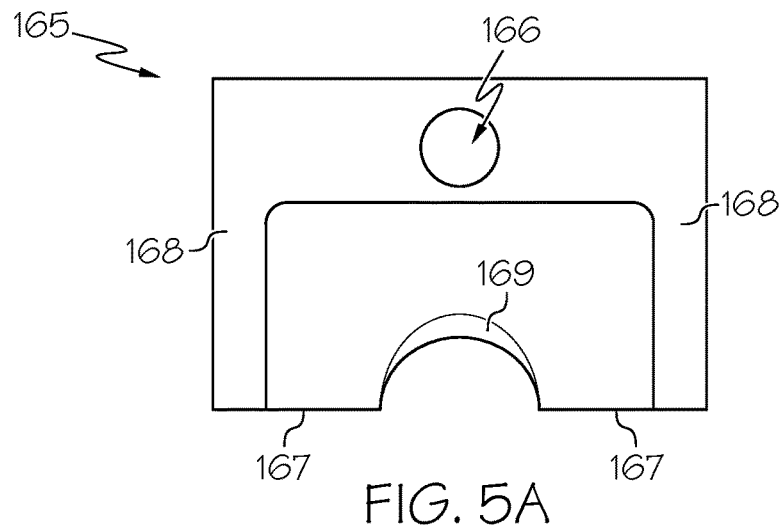
FIG. 5A schematically depicts a top plan view of an illustrative cutting die of the cutting device of FIG. 4 according to one or more embodiments shown and described herein.
Figure 5B:
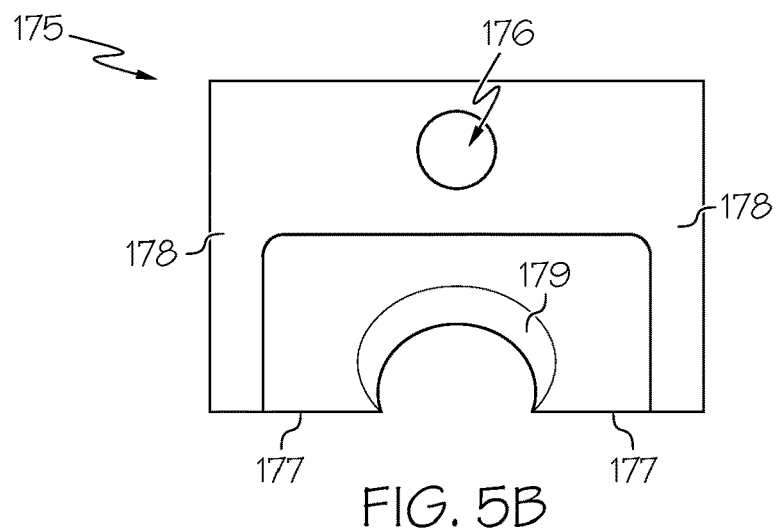
FIG. 5B schematically depicts a top plan view of another illustrative cutting die of the cutting device of FIG. 4 according to one or more embodiments shown and described herein.
Figure 5C:
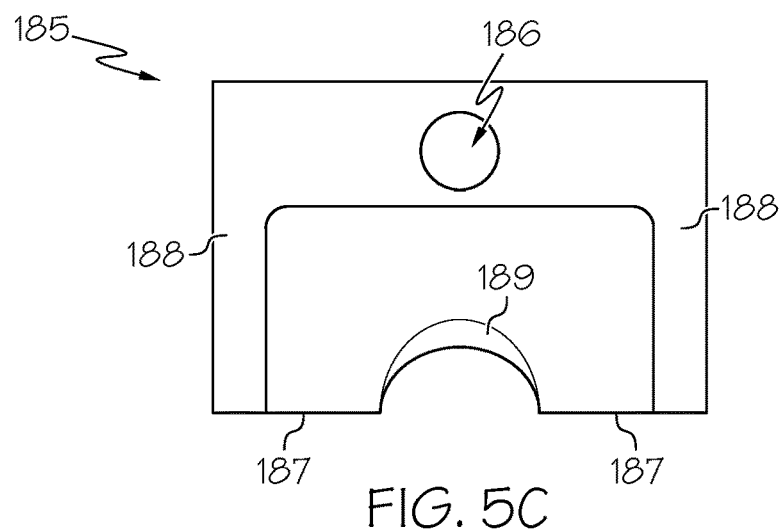
FIG. 5C schematically depicts a top plan view of yet another illustrative cutting die of the cutting device of FIG. 4 according to one or more embodiments shown and described herein.

For example, FIGS. 5A-5C illustrate exemplary cutting apparatuses that may be coupled to the cutting device 140 of the stripping system 100. Generally, a radius of the blade curvature and a length of the blade edges may selectively vary amongst different cutting apparatuses. In particular, FIGS. 5A-5C depict varying cutting apparatuses 165, 175, 185 that include different blade curvatures 169, 179, 189 and blade edges 167, 177, 187, respectively. Each of the cutting apparatuses 165, 175, 185 include at least one slot 166, 176, 186 sized to receive at least one fastening member 154 therethrough for coupling the cutting apparatus 165, 175, 185 to the engagement face 141 of the cutting device 140. Additionally, each of the cutting apparatuses 165, 175, 185 include side panels 168, 178, 188 extending laterally outward relative to the blade curvature 169, 179, 189. The side panels 168, 178, 188 of the cutting apparatuses 165, 175, 185 are sized to form a planar surface area in which additional fastening members 154 engage to thereby securely fix the cutting apparatus 165, 175, 185 to the engagement face 141 of the cutting device 140.

Accordingly, the cutting apparatuses 165, 175, 185 vary relative to the cutting apparatuses 148, 158 shown and described above with respect to the blade curvatures and/or blade edges. It should be understood that the exemplary cutting apparatuses 165, 175, 185 and the corresponding blade curvatures 169, 179, 189 and/or blade edges 167, 177, 187 are merely illustrative examples such that various other cutting apparatuses having different shapes, sizes, and blade curvatures may be coupled to the stripping system 100. Accordingly, a profile of the cutting interface 157 defined between the pair of cutting apparatuses secured to the cutting device 140 will vary depending on the selected blade curvatures. In this instance, the selected cutting apparatus may be determined based on a size and/or shape of the large diameter cable 200 to be stripped by the stripping system 100. As described above with respect to the first cutting apparatus 148 and the second cutting apparatus 158, it should be understood that the cutting apparatuses 165, 175, 185 are sized and shaped to inhibit any contact and damage to the internal components of the large diameter cable 200 being received within the stripping system 100. Accordingly, the cutting apparatuses 165, 175, 185 include blade curvatures 169, 179, 189 and/or blade edges 167, 177, 187 that are particularly sized to only cut through a portion of the outer jacket 203 of the large diameter cable 200 such that an entire thickness of the outer jacket 203 is never severed by the cutting apparatuses 165, 175, 185.

Referring to FIGS. 6A-6B, the large diameter cable 200 is depicted. As briefly described above, the large diameter cable 200 includes the outer jacket 203 disposed about a core 208 of the large diameter cable 200. In particular, the outer jacket 203 includes an outer surface 202 and an inner surface 204 defining a thickness T of the outer jacket 203, with the inner surface 204 defining the core 208. The large diameter cable 200 and the outer jacket 203 disposed thereon extends between a distal portion 201 and a proximal portion 209, with the large diameter cable 200 generally defining an elliptical shape. The large diameter cable 200 includes a diameter and/or thickness within the core 208 sufficient to enclose one or more internal components therein. In the present example, the large diameter cable 200 is a large diameter multiconductor electrical cord and the internal components of the large diameter cable 200 are electrical conductors 206.

As merely an illustrative example, the term "large diameter multiconductor electrical cable" generally refers to multiconductor electrical cable containing wires 8 AWG or larger, including, but not limited to, 8 AWG wire, 7 AWG wire, 6 AWG wire, 5 AWG wire, 4 AWG wire, 3 AWG wire, 2 AWG wire, 1 AWG wire, 0 AWG wire, 00 AWG wire, 000 AWG wire, and 0000 AWG wire. These cables are referred to as Type W, SO, SJO, SEO, SEOW, STOW, SJTOW, and SEOOW and generally include service cables having a voltage rating of at least 300 volts to about 600 volts, include oil resistant insulation (i.e., from an oil resistant outer jacket 203 disposed thereon), and/or has water resistant properties. The cables may comprise about 3 conductors to about 5 conductors disposed within the outer jacket 203. It should be understood that the cables referred to herein are merely illustrative examples such that other large diameter cables may be used with the stripping system 100 of the present disclosure. While AWG ratings are provided herein, it should be understood that other wire thickness standards may also be used without departing from the scope of the present disclosure.

The thickness T of the outer jacket 203 may range from about 0.5 millimeters to about 10 millimeters. However, it should be understood that this thickness T range is merely illustrative such that the thickness T of the outer jacket 203 may vary in accordance with standard protective sheath coatings for a cable having a relatively large diameter. The outer jacket 203 is a protective sheath and/or insulation material that may surround one or more internal components received within the core 208 of the large diameter cable 200. The outer jacket 203 may be formed of rubber, silicone, thermoplastic materials (such as polyvinyl chloride (PVC), polyethylene (PE), nylon (polyimide), chlorinated polyethylene (CPE), thermoplastic polyolefin (TPO)), thermoset materials (such as polychloroprene (CR), chlorosulfonated polyethylene CSPE, CP), a nitrile/PVC blend (NBR/PVC), chlorinated polyethylene, a cross-linked polyolefin (XLPO)), and the like.

As mentioned above, the various devices of the stripping system 100 described with respect to FIGS. 1-5 may be used to carry out one or more processes, such as stripping the outer jacket 203 of the large diameter cable 200 described above with respect to FIG. 6. An illustrative example of the various processes is described below with respect to FIGS. 7-9.

Figure 7A:
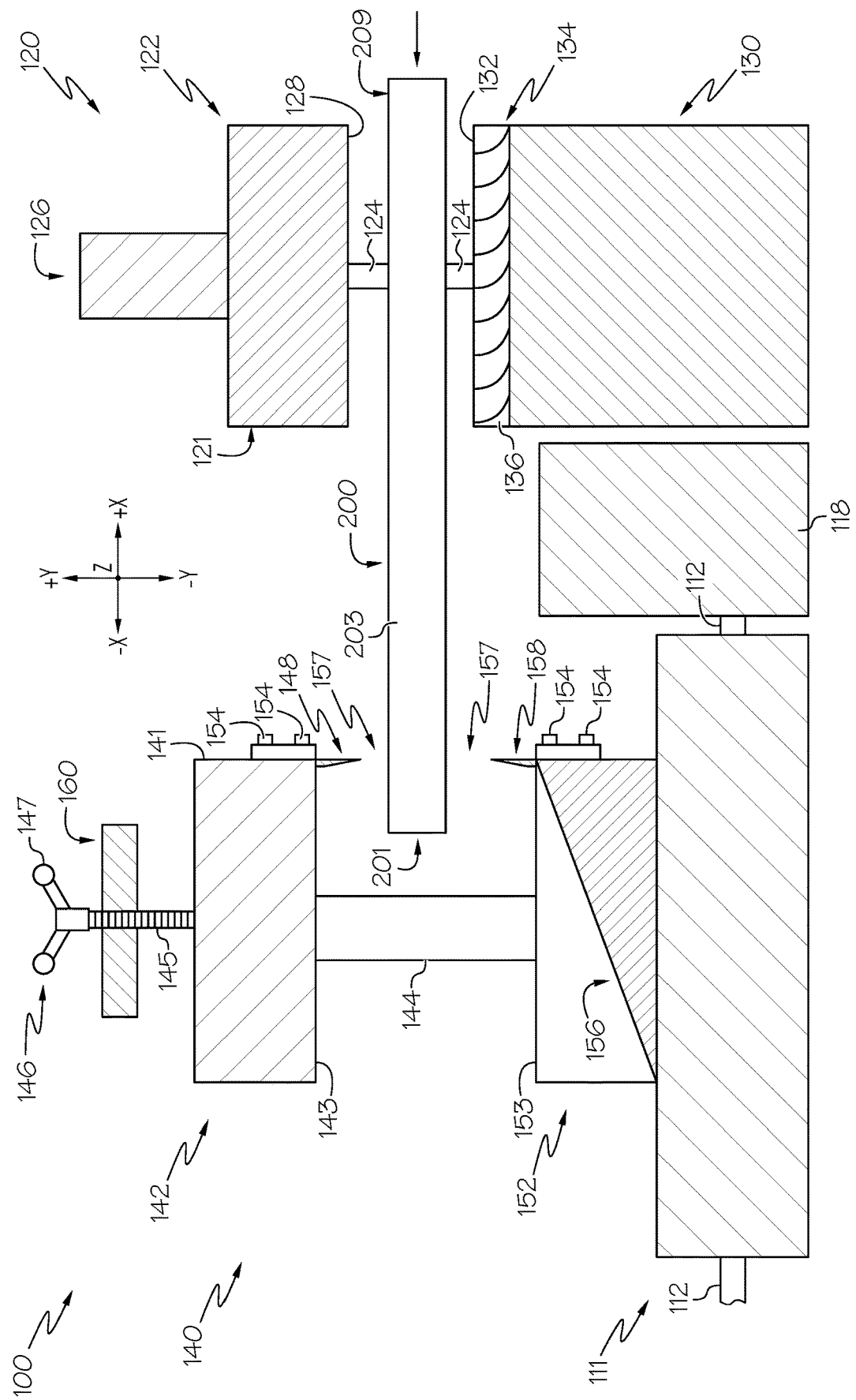
FIG. 7A schematically depicts a side view of the electrical cable of FIG. 6A inserted through the stripping system of FIG. 1 according to one or more embodiments shown and described herein.
Figure 7B:
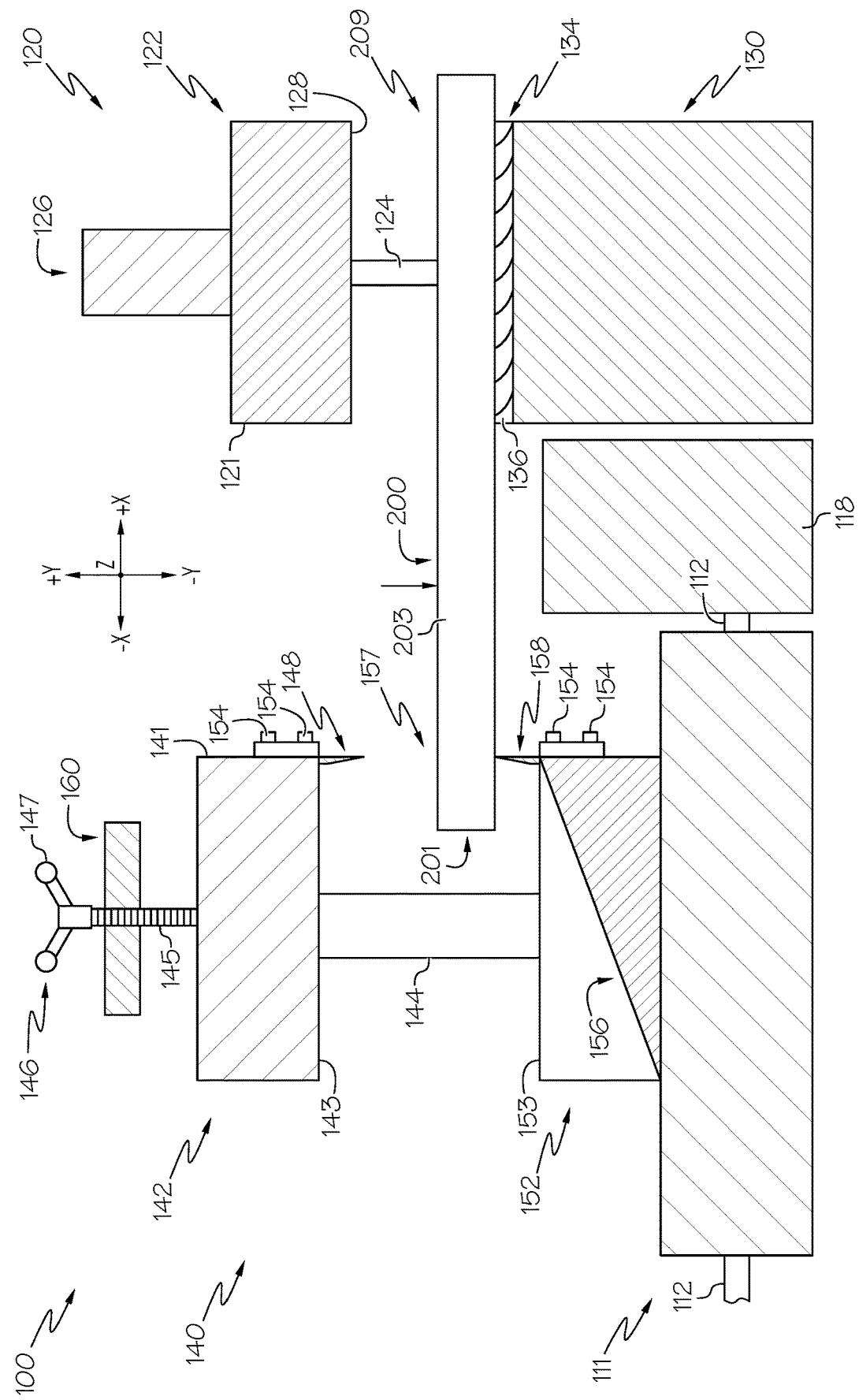
FIG. 7B schematically depicts a side view of the protective outer jacket of the electrical cable of FIG. 6A received within the stripping system of FIG. 1 according to one or more embodiments shown and described herein.
Figure 7C:
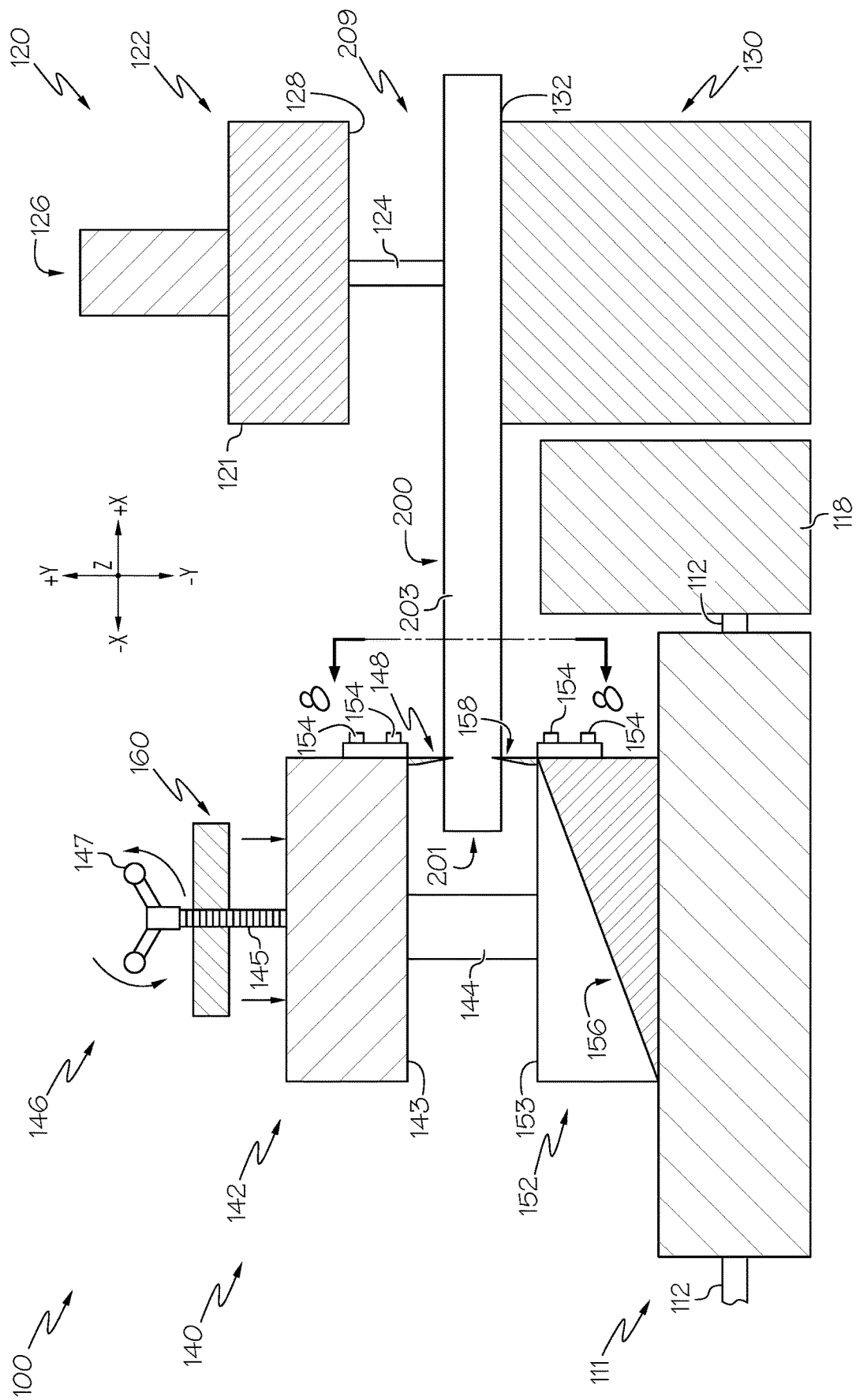
FIG. 7C schematically depicts a side view of the protective outer jacket of the electrical cable of FIG. 6A partially pierced by an illustrative cutting device of the stripping system of FIG. 1 according to one or more embodiments shown and described herein.
Figure 9:
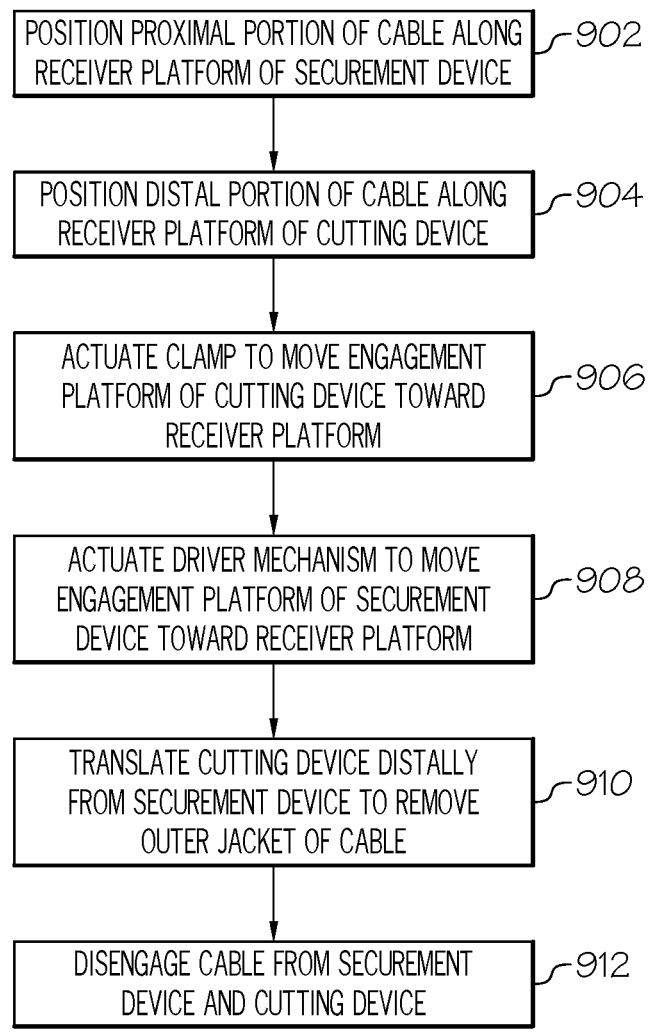
FIG. 9 depicts a flow diagram of a method of stripping the protective outer jacket of the electrical cable of FIG. 6A with the stripping system of FIG. 1 according to one or more embodiments shown and described herein.

Referring now to FIGS. 7A-7C, while also generally referring to the flow diagram schematically depicted on FIG. 9, the stripping system 100 may be used to remove a protective sheath of a cable having a relatively large diameter. Referring initially to FIG. 7A, the cutting device 140 is positioned in a default location along the base 110, relatively adjacent to the securement device 120 and the stop wall 118 relative to the X-axis of the coordinate axes of FIG. 7A. The large diameter cable 200 is inserted into the stripping system 100 by directing the distal portion 201 of the large diameter cable 200 through the securement device 120 and the cutting device 140 in the −X direction of the coordinate axes of FIG. 7A until at least a portion of the distal portion 201 is positioned between the engagement platform 142 and the receiver platform 152 of the cutting device 140. It should be understood that depending on a relative stripping location along a length of the large diameter cable 200, the distal portion 201 may be further received within the cutting device 140 and/or further withdrawn from the cutting device 140 (i.e., in the X-axis direction of the coordinate axes of FIG. 7A). In instances where the stripping location is located along an intermediate portion of the large diameter cable 200, the distal portion 201 is received further along the −X direction of the coordinate axes of FIG. 7A and within the cable channel 156 of the receiver platform 152.

In either instance, the proximal portion 209 is positioned between the engagement platform 122 and the receiver platform 130 of the securement device 120. At block 902 of FIG. 9, the proximal portion 209 of the large diameter cable 200 is thereafter positioned along the support surface 132 of the receiver platform 130, and in particular within the cable channel 134 of the support surface 132, by moving the proximal portion 209 in the −Y direction of the coordinate axes of FIG. 7A toward the cable channel 134.

Referring to FIG. 7B, as the large diameter cable 200 is lowered relative to the receiver platform 130 of the securement device 120 (and the −Y direction of the coordinate axes of FIG. 7B), the plurality of gripping features 136 engage the outer jacket 203 of the large diameter cable 200 to thereby securely retain the large diameter cable 200 within the cable channel 134. At block 904 of FIG. 9, the distal portion 201 of the large diameter cable 200 is positioned along the receiver platform 152 of the cutting device 140. In the present example, as seen in FIG. 7B, the outer jacket 203 of the large diameter cable 200 is positioned against the second cutting apparatus 158 of the receiver platform 152 such that the distal portion 201 of the large diameter cable 200 rests on the second cutting apparatus 158 as the proximal portion 209 is received within the cable channel 134.

At block 906 of FIG. 9, the clamp 146 of the cutting device 140 is actuated to thereby move the engagement platform 142 relative to the receiver platform 152 in the −Y direction of the coordinate axes of FIG. 7B. In particular, as seen in FIG. 7C, the engagement platform 142 translates along the one or more columns 144 towards the receiver platform 152 (in the −Y direction of the coordinate axes of FIG. 7B) in response to rotation of the handle 147 of the clamp 146 (about the Y-axis of the coordinate axes of FIG. 7B), until the first cutting apparatus 148 of the engagement platform 142 pierces the outer jacket 203 of the large diameter cable 200. With at least the distal portion 201 of the large diameter cable 200 received within the cutting interface 157, the first cutting apparatus 148 pierces the outer jacket 203 of the large diameter cable 200 and urges the distal portion 201 into the second cutting apparatus 158 as the engagement platform 142 translates toward the receiver platform 152 (i.e., in the −Y direction of the coordinate axes of FIG. 7B). Accordingly, the second cutting apparatus 158 pierces the outer jacket 203 of the large diameter cable 200 in response to the engagement platform 142 translating toward the receiver platform 152 of the cutting device 140 in the −Y direction of the coordinate axes of FIG. 7B.

Figure 8:
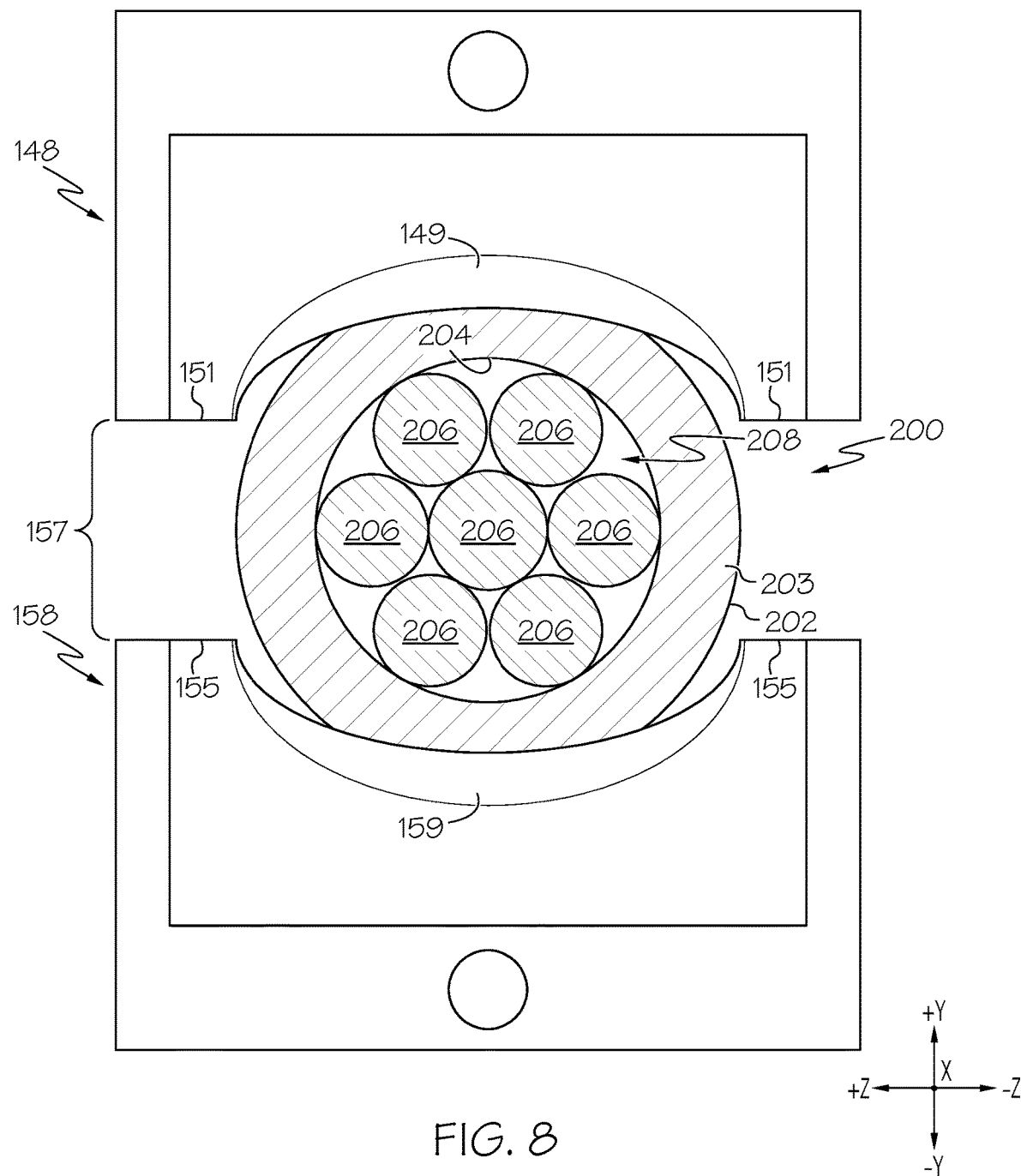
FIG. 8 schematically depicts a front view of the protective outer jacket of the electrical cable of FIG. 6A partially pierced by a pair of cutting apparatuses of the stripping system of FIG. 1 according to one or more embodiments shown and described herein.

Referring now to FIG. 8, a size, shape, and curvature of the first blade curvature 149 and the second blade curvature 159 of the cutting apparatuses 148, 158, respectively, are such to ensure the outer jacket 203 of the large diameter cable 200 is only partially pierced. Accordingly, the blade curvatures 149, 159 are configured to inhibit contacting, damaging, and/or severing the inner surface 204 when the first cutting apparatus 148 translates toward (i.e., in the −Y direction of the coordinate axes of FIG. 7B) and engages the second cutting apparatus 158.

Rather, the outer surface 202 of the outer jacket 203 is initially pierced through by the first and second cutting apparatuses 148, 158 while the inner surface 204 of the outer jacket 203 remains entirely intact. Accordingly, the electrical conductors 206 disposed within the core 208 of the large diameter cable 200 remain unaffected by the insertion of the first and second cutting apparatuses through the outer jacket 203. In other words, the large diameter cable 200 is only partially severed by the cutting device 140, and in particular, only a portion of the thickness T of the outer jacket 203 is partially severed by the cutting device 140. Nonetheless, in response to the insertion of the cutting apparatuses 148, 158 through at least a portion of the thickness T of the outer jacket 203, the outer jacket 203 is effectively weakened along the cutting interface 157 defined by the first and second cutting apparatuses 148, 158.

It should be understood that an extent (i.e., depth) of cut into the outer jacket 203 of the large diameter cable 200 may be selectively controlled by assembling a cutting apparatus to the cutting device 140 that includes a blade curvature having a size, shape, and radius of curvature desired in accordance with the diameter of the cable 200 and/or thickness of the outer jacket 203 to be stripped by the stripping system 100.

Figure 7D:
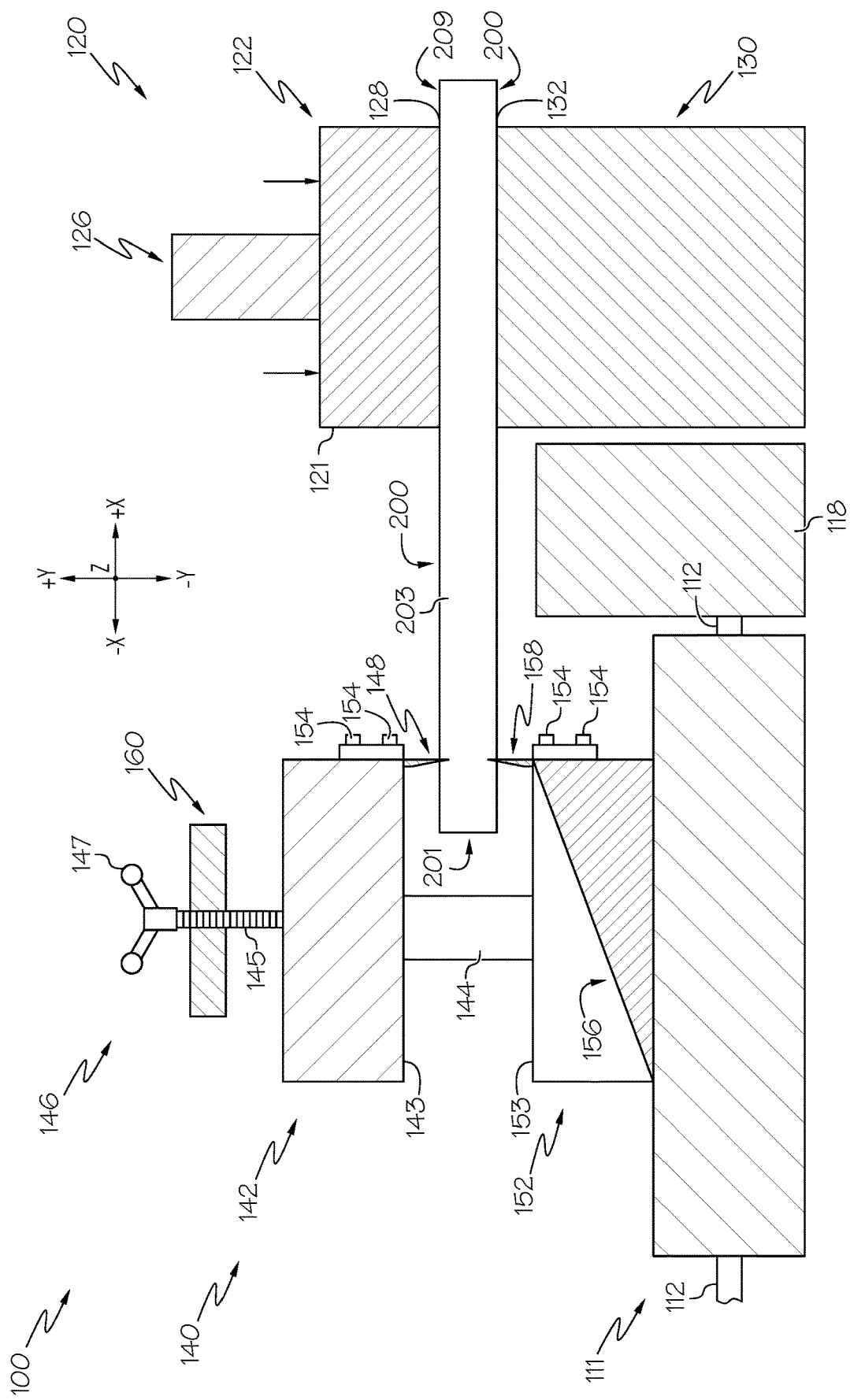
FIG. 7D schematically depicts a side view of the protective outer jacket of the electrical cable of FIG. 6A secured by an illustrative securement device of the stripping system of FIG. 1 according to one or more embodiments shown and described herein.

Referring to FIG. 9, at block 908, the driving mechanism 126 of the securement device 120 is actuated to thereby move the engagement platform 122 relative to the receiver platform 130. In particular, as seen in FIG. 7D, the engagement platform 122 translates along the one or more columns 124 toward the receiver platform 130 (i.e., in the −Y direction of the coordinate axes of FIG. 7D), in response to activation of the driving mechanism 126, until the compression surface 128 of the engagement platform 122 engages the support surface 132 of the receiver platform 130. With at least the proximal portion 209 of the large diameter cable 200 received within the cable channel 134 of the receiver platform 130 as the engagement platform 122 translates toward the receiver platform 130 (i.e., in the −Y direction of the coordinate axes of FIG. 7D), the compression surface 128 compresses against the proximal portion 209 of the large diameter cable 200 to thereby secure the proximal portion 209 of the large diameter cable 200 to the securement device 120. With the proximal portion 209 of the large diameter cable 200 secured to the securement device 120, a position of the distal portion 201 of the large diameter cable 200 between the engagement platform 142 and the receiver platform 152 of the cutting device 140 is relatively fixed (in the X-axis direction of the coordinate axes of FIG. 7D).

It should be understood that in other embodiments, the engagement platform 122 of the securement device 120 may be translated toward the receiver platform 130 (i.e., in the −Y direction of the coordinate axes of FIG. 7D) prior to the engagement platform 142 of the cutting device moving toward the receiver platform 152 to sever the distal portion 201 of the large diameter cable 200. In this instance, the proximal portion 209 of the large diameter cable 200 is fixedly secured between the compression surface 128 and support surface 132 of the securement device 120 before the first and second cutting apparatuses 148, 158 partially sever the outer jacket 203 of the large diameter cable 200.

Figure 7E:
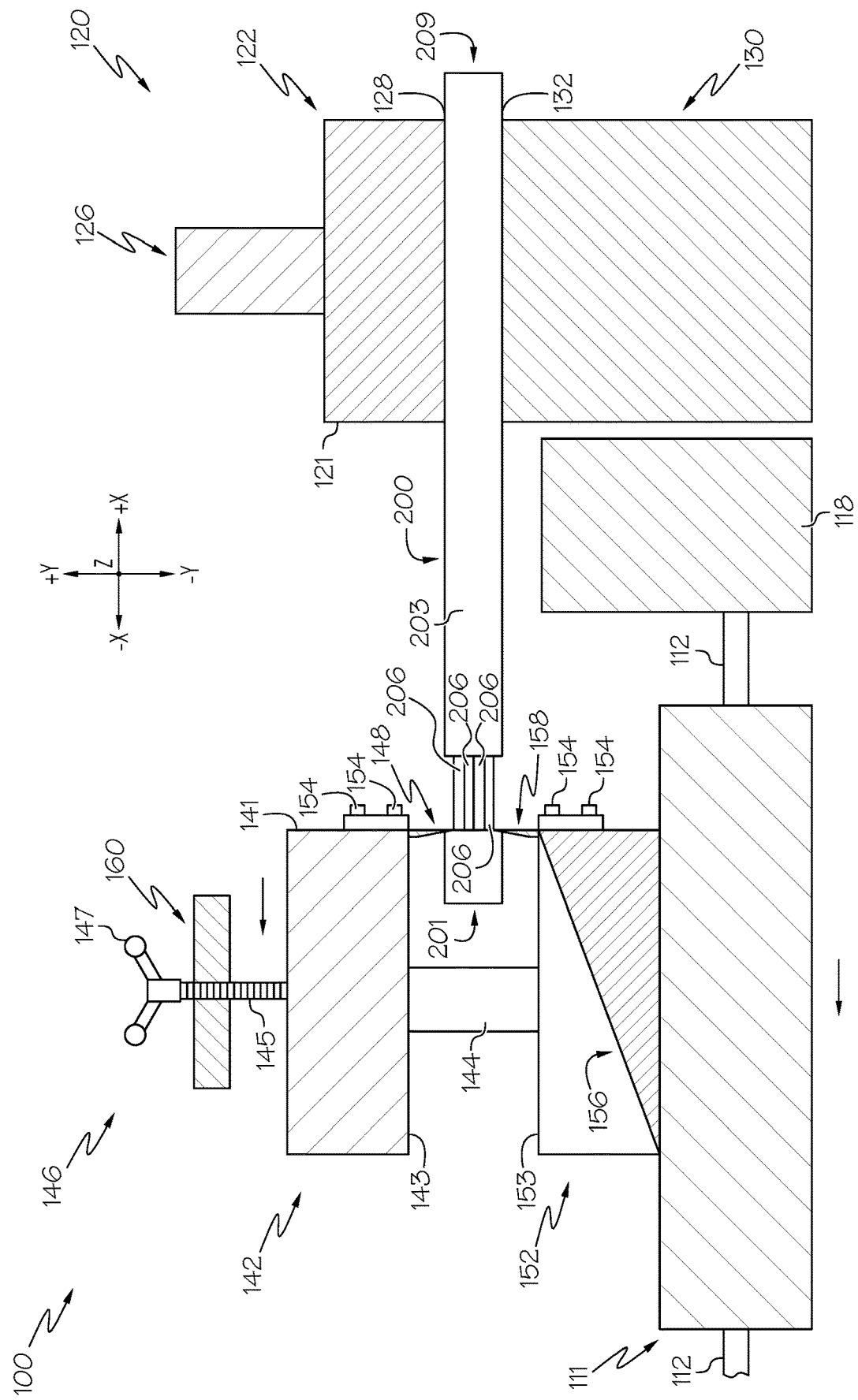
FIG. 7E schematically depicts a side view of the protective outer jacket of the electrical cable of FIG. 6A partially stripped by the stripping system of FIG. 1 according to one or more embodiments shown and described herein.

Referring to FIG. 9, at block 910, with the outer jacket 203 of the large diameter cable 200 partially severed along the cutting interface 157 by the first and second cutting apparatuses 148, 158, the cutting device 140 is moved relatively away from the securement device 120 and the stop wall 118 (i.e., in the −X direction of the coordinate axes of FIG. 7E) to generate a pulling force onto the weakened portion of the outer jacket 203. In this instance, the weakened portion of the outer jacket 203, along the distal portion 201, is separated from a remaining portion of the outer jacket 203 along the proximal portion 209. Referring to FIG. 7E, the cutting device 140 is slidably translated along the rails 112 of the base 110 distally from the securement device 120 (i.e., in the −X direction of the coordinate axes of FIG. 7E) to thereby remove the weakened portion of the outer jacket 203 from the remaining portion of the outer jacket 203. In particular, translating the cutting device 140 in the −X direction of the coordinate axes of FIG. 7E provides for the simultaneous translation of the first and second cutting apparatuses 148, 158 in the −X direction while the cutting apparatuses 148, 158 are still engaged with the outer jacket 203. In this instance, the portion of the outer jacket 203 received within the cutting device 140 (i.e., between the engagement surface 143 and the support surface 153) is stripped from the long diameter cable 200 and the remaining portion of the outer jacket 203 not received within the cutting device 140. It should be understood that in other embodiments the securement device 120 may move relative to the cutting device 140 (i.e., in the +X direction of the coordinate axes of FIG. 7E) to strip the weakened portion of the outer jacket 203 from the remaining portion of the outer jacket 203.

In the present example, the translation of the cutting device 140 along the rails 112 in the −X direction of the coordinate axes of FIG. 7E is provided automatically in response to the actuation of the driving mechanism 126 subsequently after the translation of the engagement platform 122 of the securement device 120 in the −Y direction of the coordinate axes of FIG. 7E. Accordingly, it should be understood that the driving mechanism 126 serves to generate a force to initially move the engagement platform 122 toward the receiver platform 130 in the −Y direction to secure the long diameter cable 200 and thereafter generates a force to move the cutting device 140 relatively away from the securement device 120 in the −X direction. In some embodiments, the driving mechanism 126 is actuated separately to provide for the relative movements of the securement device 120 and the cutting device 140. Alternatively, the cutting device 140 is manually translated along the one or more rails 112 in the −X direction of the coordinate axes of FIG. 7E such that the driving mechanism 126 is solely coupled to the securement device 120 in other embodiments.

Due to the continued engagement of the proximal portion 209 of the large diameter cable 200 at the securement device 120, and in particular between the engagement platform 122 and the receiver platform 130, the translation of the cutting device 140 in the −X direction of the coordinate axes of FIG. 7E does not cause the large diameter cable 200 to simultaneously translate in the −X direction. Rather, with the proximal portion 209 received within the cable channel 134, frictionally held by the plurality of gripping features 136, and compressed between the compression surface 128 and the support surface 132, a position of the large diameter cable 200 along the X-axis of the coordinate axes of FIG. 7E remains fixed during translation of the cutting device 140 in the −X direction such that only a position of the portion of the large diameter cable 200 in contact with the cutting device 140 (i.e., the weakened portion of the outer jacket 203 in contact with the cutting apparatuses 148, 158) is manipulated. As a result, the distal portion 201 of the outer jacket 203 is effectively stripped from the remaining proximal portion 209.

As seen in FIG. 7E, the electrical conductors 206 remain intact and unimpaired by the translation of the cutting device 140 in the −X direction of the coordinate axes of FIG. 7E due to the controlled piercing of the first and second cutting apparatuses 148, 158. The weakened portion (i.e., distal portion 201) of the outer jacket 203 is received along the cable channel 156 of the receiver platform 152. Due to the sloped profile of the cable channel 156, it should be understood that the weakened portion of the outer jacket 203 is moved along the ramp formed therein and toward a rear of the cutting device 140 (i.e., in the −X direction of the coordinate axes of FIG. 7E) opposite of the engagement face 141. The sloped profile of the cable channel 156 facilitates access and retrieval of the weakened portion of the outer jacket 203 after the stripping process has been performed and inhibits contact between a user and the cutting apparatuses 148, 158 of the cutting device 140.

Referring back to FIG. 9, at block 912, once the weakened portion of the outer jacket 203 is removed from the remaining portion of the outer jacket 203 still disposed over the large diameter cable 200, the engagement platform 122 of the securement device 120 and the engagement platform 142 of the cutting device 140 are raised relative to the receiver platform 130 and the receiver platform 152, respectively, (i.e., in the +Y direction of the coordinate axes of FIG. 7E) to disengage the large diameter cable 200 from the stripping system 100 and facilitate removal of the large diameter cable 200.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A stripping system comprising:
a securement device including a receiver platform and an engagement platform, the receiver platform of the securement device having a cable channel extending along a length of the securement device, the cable channel sized and shaped to receive a first portion of a large diameter cable having an outer jacket defining a thickness of at least 0.5 mm therein, the engagement platform of the securement device translatable relative to the receiver platform of the securement device to compress against the first portion of the large diameter cable within the cable channel to thereby secure the large diameter cable;
a pair of parallel rails extending longitudinally away from the securement device; and
a cutting device slidably positioned on the pair of parallel rails and movable along the pair of parallel rails relative to the securement device, the cutting device including a receiver platform, the receiver platform of the cutting device including a first cutting apparatus arranged a distance apart from a second cutting apparatus, the first cutting apparatus and the second cutting apparatus each having a single arcuate section disposed directly between two planar end sections, the receiver platform of the cutting device being sized and shaped to receive a second portion of the large diameter cable therein, and the second cutting apparatus being movable in a first linear direction toward the first cutting apparatus;

wherein the second cutting apparatus moves in the first linear direction toward the first cutting apparatus until contact between the planar end sections of the first cutting apparatus and the second cutting apparatus prevent further movement such that the single arcuate sections of the first cutting apparatus and the second cutting apparatus define a cutting interface therebetween that is sized to partially sever the outer jacket of the large diameter cable such that a portion of the 0.5 mm thickness of the outer jacket remains partially intact, and wherein, after partially severing the outer jacket, the cutting device maintains the cutting interface and slides along the pair of parallel rails in a second linear direction transverse to the first linear direction away from the securement device to separate the outer jacket of the second portion of the large diameter cable from a remainder of the large diameter cable to leave an end portion of wires of the large diameter cable exposed.

2. The stripping system of claim 1, wherein each of the first cutting apparatus and the second cutting apparatus is a blade or a die.

3. The stripping system of claim 1, wherein the securement device includes a driving mechanism that translates the engagement platform of the securement device relative to the receiver platform of the securement device in response to actuating the driving mechanism.

4. The stripping system of claim 3, wherein the driving mechanism is a pneumatic driving mechanism.

5. The stripping system of claim 1, wherein the cutting device includes a clamp that translates the first cutting apparatus relative to the second cutting apparatus in response to actuating the clamp.

6. The stripping system of claim 5, wherein the clamp is a manually driven clamp.

7. The stripping system of claim 1, wherein the receiver platform of the securement device includes a plurality of gripping features extending within the cable channel for securely grasping the first portion of the large diameter cable therein.

8. The stripping system of claim 1, wherein the sliding of the cutting device along the pair of parallel rails causes a core portion of the large diameter cable to be exposed as a result of the separation of the outer jacket, and wherein the securement device and the cutting device are configured to release the large diameter cable with the exposed core portion from the stripping system.

9. A method, comprising:
positioning a proximal portion of a large diameter cable having an outer jacket of at least 0.5 millimeters at least partially within a cable channel extending along a length of a receiver platform of a securement device and a distal portion of the large diameter cable on a first cutting apparatus of a cutting device, the first cutting apparatus having a single arcuate section disposed between two planar end sections;

causing a linear movement of a second cutting apparatus of the cutting device, the second cutting apparatus having a single arcuate section disposed directly between two planar end sections, toward the first cutting apparatus to join the two planar end sections of the first cutting apparatus and the second cutting apparatus together until contact between the planar end sections of the first cutting apparatus and the second cutting apparatus prevent further movement such that the single arcuate sections of the first cutting apparatus and the second cutting apparatus define a cutting interface therebetween, thereby partially severing the outer jacket of the distal portion of the large diameter cable positioned within the cutting interface such that a portion of the 0.5 mm thickness of the outer jacket remains partially intact;

securing the proximal portion of the large diameter cable with the securement device; and maintaining the cutting interface and moving the cutting device along a linear path defined by a pair of parallel rails, the linear path transverse to the linear movement and away from the securement device to separate the partially severed outer jacket from the distal portion of the large diameter cable to leave an end portion of wires of the large diameter cable exposed.

10. The method of claim 9, wherein securing the proximal portion of the large diameter cable with the securement device comprises actuating a driving mechanism of the securement device that causes an engagement platform of the securement device to move toward a receiver platform of the securement device, compressing the proximal portion of the large diameter cable therebetween.

11. The method of claim 9, wherein causing the linear movement the second cutting apparatus comprises actuating a clamp of the cutting device that causes the linear movement of the second cutting apparatus toward the first cutting apparatus.

12. The method of claim 9, further comprising disengaging the large diameter cable from the securement device.

13. The method of claim 9, wherein moving the cutting device away from the securement device to separate the partially severed outer jacket from the distal portion of the large diameter cable partially exposes a core of the large diameter cable.

14. The method of claim 9, further comprising, after moving the cutting device along the linear path to separate the partially severed outer jacket, releasing the large diameter cable with an exposed core portion that results from separation of the partially severed jacket.

* * * * *